United States Patent
Sano et al.

(10) Patent No.: US 7,272,162 B2
(45) Date of Patent: Sep. 18, 2007

(54) TRANSMITTER AND RECEIVER FOR SPREAD-SPECTRUM COMMUNICATION SYSTEM, AND MODULATION AND DEMODULATION METHODS THEREOF

(75) Inventors: Hiroyasu Sano, Tokyo (JP); Hiroshi Kubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 681 days.

(21) Appl. No.: 10/399,772

(22) PCT Filed: Oct. 17, 2001

(86) PCT No.: PCT/JP01/09117

§ 371 (c)(1),
(2), (4) Date: Apr. 24, 2003

(87) PCT Pub. No.: WO02/35726

PCT Pub. Date: May 2, 2002

(65) Prior Publication Data

US 2004/0109419 A1    Jun. 10, 2004

(30) Foreign Application Priority Data

Oct. 24, 2000    (JP) .............................. 2000-324032

(51) Int. Cl.
*H04B 1/69* (2006.01)
*H04B 1/707* (2006.01)
*H04B 1/713* (2006.01)

(52) U.S. Cl. ...................... 375/135; 375/132
(58) Field of Classification Search ................ 375/132, 375/135

See application file for complete search history.

(56) References Cited

U.S. PATENT DOCUMENTS 6,246,713 B1 *    6/2001    Mattisson .................... 375/132

(Continued)

FOREIGN PATENT DOCUMENTS

EP    0 660 559 A1    6/1995

(Continued)

OTHER PUBLICATIONS

Sadayuki Abeta et al.: "Performance comparisons of coherent SC/CDMA, MC/DS-CDMA, MC-CDMA on down-link broadband radio packet transmission" IEICE Technical Report of IEICE, RCS99-130, pp. 63-70, Oct. 1999 (with partial English translation).

(Continued)

*Primary Examiner*—David C. Payne
*Assistant Examiner*—Erin M. File
(74) *Attorney, Agent, or Firm*—Oblon, Spivak, McClelland, Maier & Neustadt, P.C.

(57) ABSTRACT

A data hopping device is provided with a hopping generation unit and a data selection unit, the hopping pattern generation unit generating a predetermined hopping pattern, and the data selection unit outputs a plurality of subcarrier transmission signals corresponding to respective subcarriers, by receiving transmission data and outputting only the data carried in the subcarrier designated by the hopping pattern as the subcarrier transmission signal, while maintaining the other subcarrier transmission signals at a zero output level. An inverse Fourier transform device subjects the entirety of subcarrier reception signals output from the data selection unit to inverse Fourier transform and outputs frequency-hopped spread-spectrum transmission signals.

9 Claims, 23 Drawing Sheets

U.S. PATENT DOCUMENTS

| | | | |
|---|---|---|---|
| 6,563,881 B1* | 5/2003 | Sakoda et al. | 375/260 |
| 6,901,121 B1* | 5/2005 | Dubrovin et al. | 375/346 |
| 7,051,269 B1* | 5/2006 | Hindelang et al. | 714/790 |
| 2001/0020917 A1* | 9/2001 | Hamada et al. | 342/442 |

FOREIGN PATENT DOCUMENTS

| | | |
|---|---|---|
| EP | 0 939 501 A2 | 9/1999 |
| JP | 6-85781 | 3/1994 |
| JP | 7-38468 | 2/1995 |
| JP | 7-226724 | 8/1995 |
| JP | 7-288491 | 10/1995 |
| JP | 8-9457 | 1/1996 |
| JP | 8-191285 | 7/1996 |
| JP | 11-17644 | 1/1999 |
| JP | 11-317723 | 11/1999 |
| JP | 2000-174665 | 6/2000 |
| JP | 2001-156739 | 6/2001 |

OTHER PUBLICATIONS

Mitsuo Yokoyama: "Spread-spectrum communication system" Kagaku Gijutsu Shuppan, pp. 567-566 May 1988 (with partial English translation).

Takahiro Oie et al.: "Fast hopping frequency synthesizer using differences of phase-errors" IEICE B-II, vol. J81-B-II, No. 2, pp. 215-133 Feb. 1998.

Ohkawa Mitsugu, et al., "Orthgonal Multi-Carrier FH-CDMA schemes for Mobile Communication Systems", Technical Report of the IEICE SST93-56, Oct. 1993, pp. 25-30 and 2 cover pages (with English Abstract).

Silvia De Fina, et al., "Comparison of FH-MA Communications Using OFDM and DS-MA Systems for Wideband Radio Access", IEEE, 1998, pp. 143-147.

Qingxin Chen, et al., "Multicarrier CDMA with Adaptive Frequency Hopping for Mobile Radio Systems", IEEE Journal on Selected Areas in Communications, vol. 14, No. 9, Dec. 1996, pp. 1852-1858 and cover page.

Shengli Zhou et al., "Frequency-Hopped Generalized MC-CDMA for Multipath and Interference Suppression," MILCOM 2000, 21$^{st}$ Century Military Communications Conference Proceedings, Oct. 22-25, 2000, Piscataway, NJ, USA, vol. 2, pp. 937-941.

* cited by examiner

FIG.1
(a) TRANSMITTER
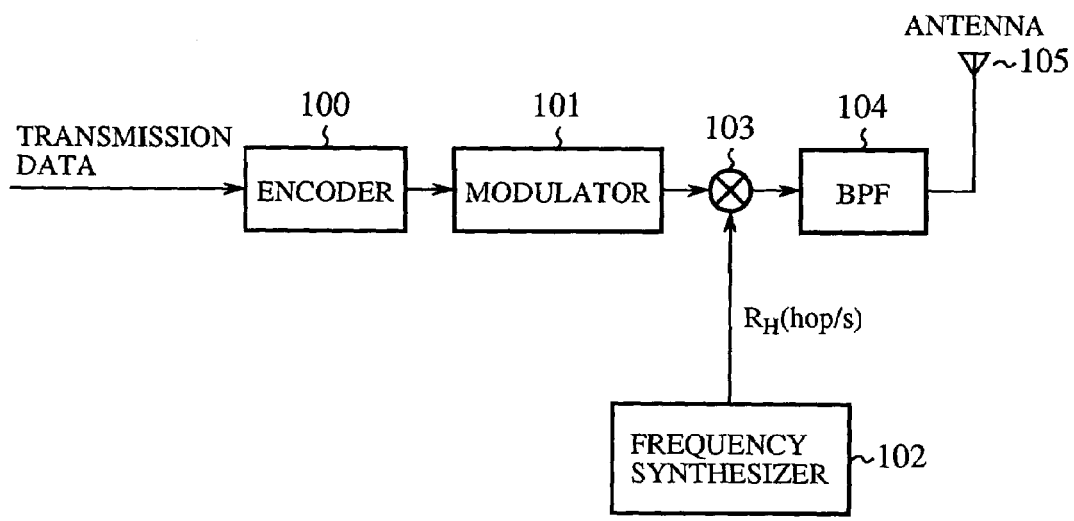
(b) RECEIVER
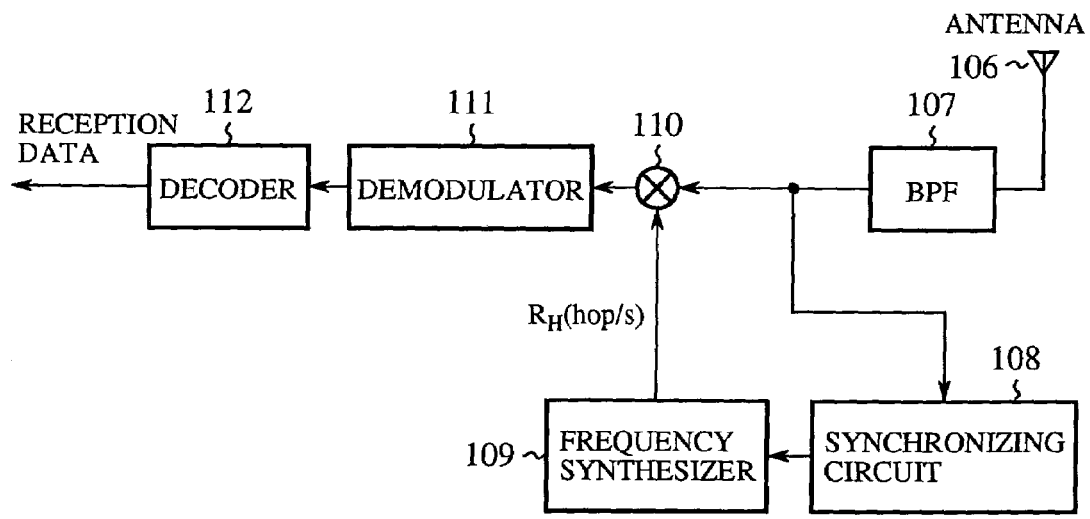

FIG.9
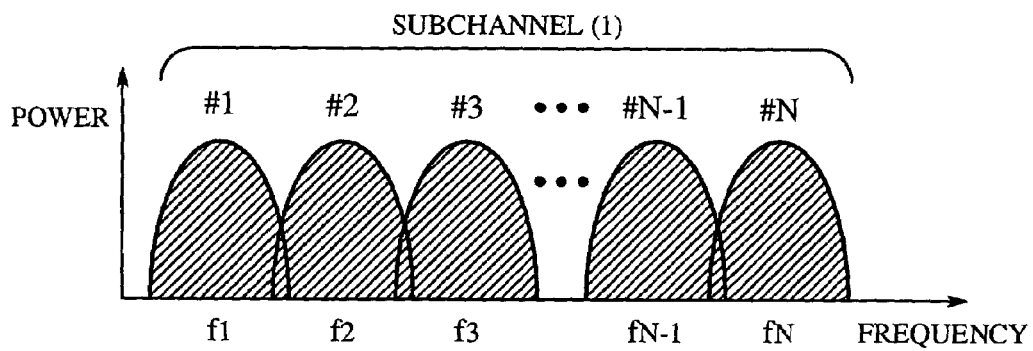
(a) FOR TRANSMISSION OF PILOT SEQUENCE, OUTPUT IS PROVIDED IN ALL SUBCARRIERS IN SUBCHANNEL
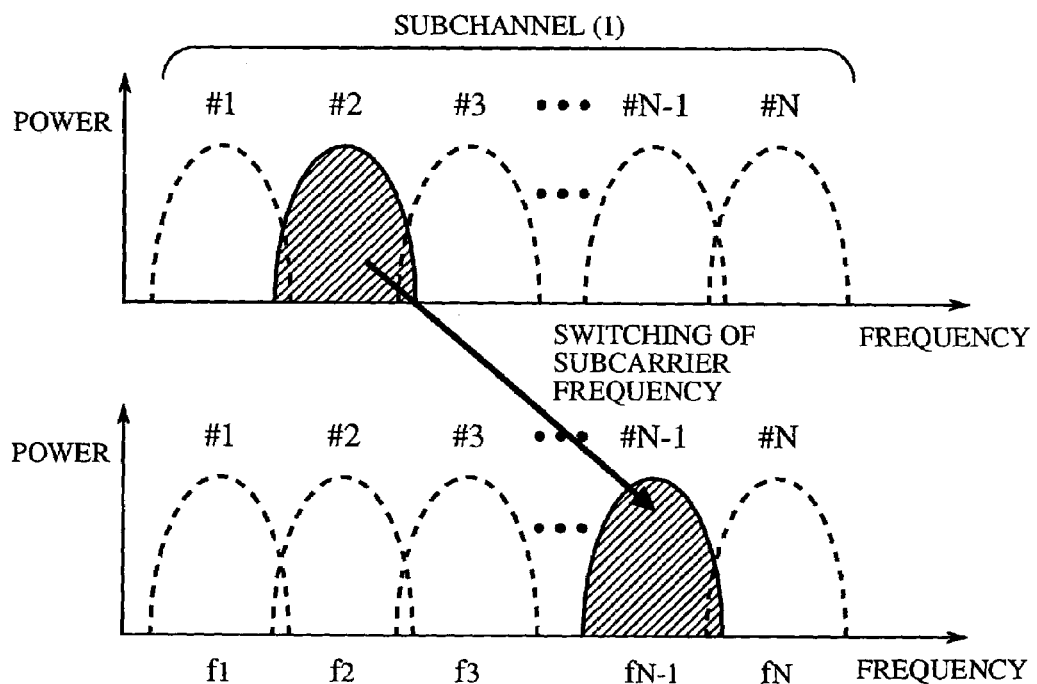
(b) FOR TRANSMISSION OTHER THAN THAT OF PILOT SEQUENCE, FREQUENCY HOPPING IS PERFORMED IN SUBCHANNEL (OUTPUT IN SELECTED SUBCARRIER)

TRANSMITTER AND RECEIVER FOR SPREAD-SPECTRUM COMMUNICATION SYSTEM, AND MODULATION AND DEMODULATION METHODS THEREOF

TECHNICAL FIELD

The present invention generally relates to transmitters, receivers and modulation and demodulation methods for a mobile spread-spectrum communication system.

BACKGROUND ART

A form of spectrum spreading wireless communication known as frequency hopping is widely used. In frequency-hopping systems for spreading spectrums, when modulated data are up-converted to a radio frequency band (RF band) using an intermediate frequency band (IF band), the frequency of a locally oscillated signal is made to hop continually over a wide frequency range.

FIG. 1 is a block diagram showing a construction of a spread-spectrum communication system of a related-art frequency-hopping scheme shown in Yokoyama "Spread-spectrum communication system" Kagaku Gjutsu Shuppan, May, 1988:564-566. In the following paragraphs, a description will be given of the related-art spread-spectrum communication system with reference to FIG. 1.

A transmitter shown in FIG. 1(a) comprises an encoder 100, a modulator 101, a frequency synthesizer 102, a mixer 103, a band-pass filter 104 and an antenna 105.

A receiver shown in FIG. 1(b) comprises an antenna 106, a band-pass filter 107, a synchronizing circuit 108, a frequency synthesizer 109, a mixer 110, a demodulator 111 and a decoder 112.

The related-art system operates as follows.

Transmission data is input to the encoder 100 for encoding into codewords. The encoder 100 converts a block of transmission data comprising a predetermined number of bits K into a predetermined codeword. The resultant codeword is input to the modulator 101. The modulator 101 subjects the input codeword to data modulation using the MFSK modulation scheme or the DPSK modulation scheme so as to produce a signal of an intermediate frequency (IF). The number of bits k constituting a block of transmission data used to produce a codeword in the encoder 100 and the modulation scheme used in the modulator 101 are selected according to the transmission rate and the quality of communication required.

The IF signal is input to the mixer 103 where the IF signal is mixed by the mixer 103 with an oscillated signal of a predetermined frequency output from the frequency synthesizer 102, so as to produce a signal of a radio frequency (RF) band. The frequency synthesizer 102 is capable of switching between frequencies of the oscillated signal. In frequency-hopping systems, the frequency of the oscillated signal of the frequency synthesizer 102 is changed at a predetermined hopping rate $R_H$ (hops/sec) according to a hopping pattern established between a pair of transmitter and a receiver. By changing the frequency of the signal oscillated in the frequency synthesizer 102, the frequency of the RF signal for transmitted data generated in the mixer 103 is also changed at a hopping rate $R_H$ (hops/sec) according to the predetermined hopping pattern. As a result, the RF signal is spread over a wider signal band than the bandwidth of the IF signal before up-conversion.

If the hopping rate $R_H$ is established as an unreasonably low rate without allowing for a rate at which the codeword is generated by the encoder 100 (hereinafter, referred to as a symbol rate), the frequency remains unchanged for a relatively long period of time, preventing the band-spreading effect for the RF signal provided by frequency hopping from taking effect properly. Accordingly, the hopping rate $R_H$ should be set to a suitable level by allowing for the symbol rate. Generally speaking, the higher the rate of data transmission and the symbol rate, the higher the hopping rate RH.

The RF signal subjected to up-conversion and output from the mixer 103 has undesired frequency components removed therefrom by the band-pass filter 104 (hereinafter, referred to as BPF) before being transmitted via the antenna 105.

The receiver shown in FIG. 1(b) receives the RF signal transmitted from the transmitter. The BPF 107 of the receiver removes unnecessary frequency components from the RF signal received via the antenna 106. The synchronizing circuit 108 monitors the variation of the frequency of the RF signal output from the BPF 107 and establishes synchronization between the transmitter and the receiver by detecting a synchronization word included in the RF signal.

When the synchronizing circuit 108 establishes synchronization between the transmitter and the receiver, the frequency synthesizer 109 changes the frequency of the oscillated signal at the predetermined hopping rate $R_H$. The frequency synthesizer 109 of the receiver changes the frequency according to the same hopping pattern referred to by the frequency synthesizer 102 of the transmitter. By synchronizing the hopping pattern of the frequency synthesizer 109 of the receiver with the hopping pattern of the transmitter, the IF signal is recovered from the band-spread RF signal. The RF signal output from the BPF 107 is multiplied for despreading by the mixer 110 by the oscillated signal output from the frequency synthesizer 109, thus producing the IF signal.

The IF signal output from the mixer 110 is subject by the demodulator 111 to a demodulation process. The decoder 112 recovers the original data bits and output the recovered data as received data.

Since the frequency-hopping communication system spreads the signal over a wide band, it has an excellent anti-fading characteristic and provides effective means to improve the quality of communication. Moreover, a frequency-hopping system is superior to other systems in anti-jamming capability and security by employing an arbitrary hopping pattern between a transmitter and a receiver.

In the related-art frequency-hopping spread-spectrum communication system, the RF signal is spread over a wide band by switching between the frequencies of the oscillated signal in the frequency synthesizers 102 and 109 at the predetermined hopping rate $R_H$. Therefore, the hopping rate $R_H$ should be set to a suitable level by allowing for the symbol rate of transmission data. When the rate of data transmission is increased and the symbol rate becomes high, the hopping rate $R_H$ should be increased. In order for the spectrum-spreading effect provided by frequency hopping to take effect properly in a communication system characterized by high-speed data transmission, a frequency synthesizer capable of switching between the oscillation frequencies at a high speed is required. A technology that provides a frequency synthesizer capable of high-speed switching is disclosed in "Fast Hopping Frequency Synthesizer using Difference of Phase-errors", The Institute of Electronics Information and Communication Engineers (IEICE) Transactions (Vol.J81-B-II, No.2, February 1998):125-133.

Even when the frequency synthesizer capable of high-speed switching as disclosed in the above reference is used, however, the oscillated signal output from the frequency synthesizer is unstable immediately after the frequency switching. This forces the mixers 103 and 110 to wait for a certain period of time (referred to as frequency switching wait time) in which it is impossible to perform a frequency conversion process. Symbol data of significance to the user cannot be transmitted during this wait time. Therefore, it is necessary to provide a predetermined guard time before and after the frequency switching.

When the hopping frequency $R_H$ is increased in the related-art spread-spectrum communication system as described above in accordance with an increase in required data transmission rate, associated reduction in the frequency switching wait time in the frequency synthesizer is limited due to hardware constraints. When the data transmission rate is increased beyond several megabits per second, the frequency switching wait time in the frequency synthesizer grows to a non-negligible level with respect to the interval between frequency switching prescribed by the hopping frequency $R_H$, causing the data transfer rate per carrier to be reduced.

The present invention has been developed with a view to resolving the problem described above and has an objective of providing a transmitter, a receiver and a modulation method for a spread-spectrum communication system with a high frequency hopping rate $R_H$ and a high data transmission efficiency, in which the time to wait for the switching of the oscillation signal frequency of the frequency synthesizer is not required so that the frequency switching of the RF signal is effected efficiently.

Another objective is to provide a transmitter, a receiver and a modulation method for a frequency-hopping spread-spectrum communication system in which the bit error rate of data exchanged between the transmitter and the receiver is improved and the quality of communication is favorable.

DISCLOSURE OF THE INVENTION

The transmitter for a spread-spectrum communication system according to the invention performs frequency-hopping spectrum spreading such that a plurality of subcarrier transmission signals corresponding to respective subcarriers for frequency-hopping are obtained by selecting a subcarrier for transmission of data in accordance with a predetermined hopping pattern, outputting only transmission data carried in a selected subcarrier as a transmission signal, while maintaining the other subcarrier transmission signals to a zero output level, and subsequently, the plurality of subcarrier transmission signals thus obtained are subjected to inverse Fourier transform.

With this, it is possible to effect frequency-hopping spectrum spreading without controlling the switching between frequencies of a frequency synthesizer. A frequency switching wait time required in the related art for the frequency synthesizer to reach a stable operation is no longer required so that a data transmission rate is improved.

The transmitter for a spread-spectrum communication system according to the invention effects frequency-hopping spectrum spreading such that transmission data is first subject to spectrum spreading according to a time-spreading scheme, and the transmission data subjected to time spreading is then converted into a plurality of subcarrier transmission signals for inverse Fourier transform.

With this, in addition to the benefit of anti-fading performance available from frequency hopping, time-spreading enables reduction in adverse effects from interference signals, thereby further improving a bit error performance and the communication quality.

The transmitter for a spread spectrum communication system according to the invention is configured such that a predetermined guard interval is inserted into a transmission signal subjected to inverse Fourier transform.

With this, adverse effects from delay waves with a delay time shorter than the guard interval are removed in a receiver in communication so that the communication quality is improved.

The transmitter for a spread-spectrum communication system according to the invention is configured such that the modulation control means determines subcarrier assignment such that the subcarriers for frequency hopping in each subchannel are spaced apart at predetermined frequency intervals, and the subcarrier assignment means rearranges the entire subcarrier transmission signals output from the subchannel modulation processing units in accordance with the subcarrier assignment.

With this, a plurality of subcarriers spaced apart at predetermined frequency intervals are used in a subchannel, resulting in less frequency correlation between the subcarriers and improvement in a frequency diversity effect from frequency-hopping. Accordingly, the quality of communication is improved even in a transmission channel seriously affected by frequency-selective fading.

The receiver for a spread-spectrum communication system according to the invention is configured such that the reception signal subjected to spectrum spreading is subject to Fourier transform so as to recover a plurality of subcarrier reception signals. By selecting the subcarrier reception signal in accordance with a predetermined hopping pattern, frequency-hopping spectrum despreading is effected for retrieving of reception data.

With this, it is possible to effect frequency-hopping spectrum spreading without controlling the switching between frequencies of a frequency synthesizer. A frequency switching wait time required in the related art for the frequency synthesizer to reach a stable operation is no longer required so that a data transmission rate is improved.

The receiver for a spread-spectrum communication system according to the invention is configured such that subchannel reception data obtained by subjecting a reception signal to frequency-hopping spectrum despreading to time-despreading and RAKE combination.

With this, in addition to the benefit of anti-fading performance available from frequency hopping, RAKE combination provides a path diversity effect, thereby further improving the communication quality and a bit error performance of reception data.

The receiver for a spread-spectrum communication system according to the invention is configured such that a power of interference affecting a transmission channel is calculated based on a pilot sequence included in subchannel reception data, and the subchannel reception data is normalized with the power of interference before being output.

With this, it is ensured that a subchannel-to-subchannel variation in the level of interference is canceled so that the quality of communication is favorable, even when the level of interference caused by multi-path delay waves differs from subchannel to subchannel.

The receiver for a spread spectrum communication system according to the invention is configured such that, after removing a predetermined guard interval attached to a reception signal by a transmitter in communication, the received signal is subject to frequency-hopping spectrum spreading and synchronous detection so as to retrieve subchannel reception data.

With this, adverse effects from delay waves with a delay time shorter than the guard interval are removed so that the communication quality is improved.

The receiver for a spread-spectrum communication system according to the invention is configured such that the subcarrier reception signal distribution means receives a plurality of subcarrier reception signals recovered by Fourier transform and outputting the subcarrier reception signals to corresponding subchannel demodulation processing units in accordance with a predetermined subcarrier assignment.

With this, a plurality of subcarriers spaced apart at predetermined frequency intervals are used in a subchannel, resulting in less frequency correlation between the subcarriers and improvement in a frequency diversity effect from frequency-hopping. Accordingly, the quality of communication is improved even in a transmission channel seriously affected by frequency-selective fading.

The transmitter for a spread-spectrum communication system according to the invention is configured such that transmission data is subject to convolution coding and interleaving. The transmission data is split into a plurality of subchannel transmission data sets through serial-to-parallel conversion. The data sets are individually subjected to spectrum-spreading for transmission. In the receiver, spectrum despreading is performed so that recovered reception data is subject to deinterleaving and error correction.

With this, it is ensured that, even when a bit error rate in a particular subchannel temporarily becomes poor in a transmission environment characterized by a serious adverse effect from interference, errors caused by the adverse effects are spread as a result of a deinterleaving process in a receiver in communication, thus enabling efficient error correction. Accordingly, the communication quality is improved.

The receiver for a spread-spectrum communication system according to the invention is configured such that a receiver notifies a transmitter of information related to the communication quality so that the transmitter is capable of determination on the communication quality based on the information and switching to an appropriate subcarrier assignment.

With this, the data transmission rate is reduced and the improvement in communication quality due to frequency hopping is enhanced when the effects from interference are serious and the communication quality is poor. Conversely, when the communication quality is favorable, the number of subcarriers used may be increased and the data transmission rate may be increased. Thus, the data transmission rate and the improvement in communication quality are suitably controlled depending on the conditions that occur in the transmission channel.

BRIEF DESCRIPTION OF THE DRAWINGS

FIG. 1 is a block diagram showing a construction of a transmitter and a receiver for a frequency-hopping spread-spectrum communication system according to the related art.

FIG. 9 shows how transmission signals subjected to inverse Fourier transform are assigned to subcarriers according to the first embodiment.

BEST MODE FOR CARRYING OUT THE INVENTION

A detailed description of the invention will be given in the following by describing the best mode for carrying out the invention.

First Embodiment

Figure 2:
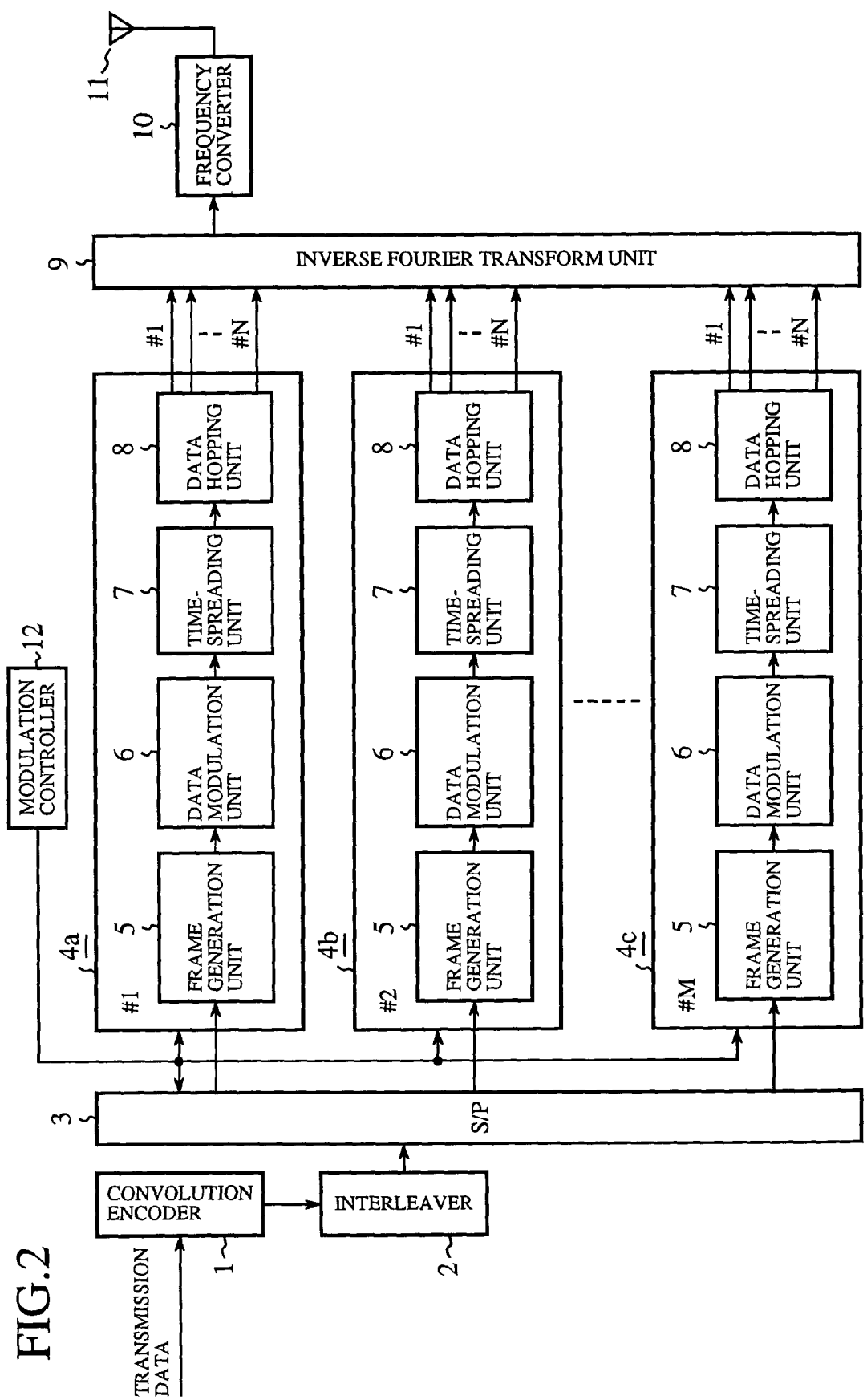
FIG. 2 is a block diagram of a frequency-hopping spread-spectrum communication system according to a first embodiment of the present invention.

FIG. 2 is a block diagram showing a construction of a transmitter for a spread-spectrum communication system according to the first embodiment. Referring to FIG. 2, the system comprises a convolution encoder 1 for subjecting input transmission data to error-correction encoding, an interleaver 2 for interleaving the encoded transmission data and a serial-to-parallel conversion unit (hereinafter, referred to as S/P) splitting the interleaved transmission data and outputting the split data for transmission using a plurality of subchannels.

The system further comprises subchannel modulation processing units 4a, 4b and 4c for modulating the transmission data of the plurality of subchannels independently. Although the transmitter shown in FIG. 2 only shows the subchannel modulation processing units 4a, 4b and 4c, the system actually comprises a sufficient number of subchannel modulation processing units 4a, 4b, . . . 4c capable of parallel processing of the transmission data in a total of M subchannels, the number of subchannels being determined by a modulation controller 12 described later. Each of the subchannel modulation processing units 4a, 4b, . . . 4c comprises a frame generation unit 5 for receiving transmission data for the subchannel and constructing a slot, a data modulation unit 6 subjecting the subchannel transmission data of a frame structure to data modulation, a time-spreading unit 7 for multiplying the subchannel transmission data subjected to data modulation by a predetermined spreading code for a time-spreading process, and a data hopping unit 8 for converting the subchannel transmission data subjected to time-spreading into transmission signals carried in a plurality of subcarriers (subcarrier transmission signals) for transmission according to the frequency hopping.

The unit further comprises an inverse Fourier transform unit 9 subjecting all the subcarrier transmission signals output from the subchannel demodulation processing units 4a, 4b, . . . 4c to inverse Fourier transform so as to generate frequency-hopped spread-spectrum transmission signals. A frequency converter 10 converts the transmission signals into RF signals and an antenna 11 transmits the RF signals.

The unit further comprises a modulation controller 12 outputting, to the subchannel modulation processing units 4a, 4b, . . . 4c and the S/P 3, a control signal relating to the modulation process.

A description will now be given of the operation of the transmitter for the spread-spectrum communication system shown in FIG. 2. Initially, the convolution encoder 1 subjects the input transmission data to convolution coding for error correction between the transmitter and the receiver. The interleaver 2 rearranges the order of transmission of the transmission data subjected to convolution coding. The interleaver 2 is provided with a memory with a predetermined number of rows and columns for data storage. The transmission data subjected to convolution coding is stored in successive columns of the memory (latitudinally). By reading the transmission data thus stored longitudinally, the order of transmission of the transmission data is rearranged (i.e. the data is interleaved).

The transmitter for the spread-spectrum communication system according to the first embodiment splits the transmission data into transmission data of a plurality of subchannels for subsequent multiplexing and parallel transmission. The following processes are performed in this operation. The modulation controller 12 determines the level of multiplication, i.e. the number of subchannels M, and informs the S/P 3 of the number thus determined. The S/P 3 is directed by the modulation controller 12 to split the serial transmission data subjected to interleaving to produce transmission data for the M subchannels and output the split data to the subchannel modulation processing units 4a, 4b, . . . 4c corresponding to the respective channels.

Each of the subchannel modulation processing units 4a, 4b, . . . 4c receiving the subchannel transmission data modulates the subchannel data independently. The subchannel transmission data for the M subchannels are processed for modulation in the M subchannel modulation processing units 4a, 4b, . . . 4c in a parallel manner. Since the processes performed in the subchannel modulation processing units 4a, 4b, . . . 4c are the same, only the operation of the subchannel modulation processing unit 4a modulating the first subchannel transmission data will be described and the description of the operations of the other subchannel modulation processing units 4b, . . . 4c is omitted.

Figure 3:
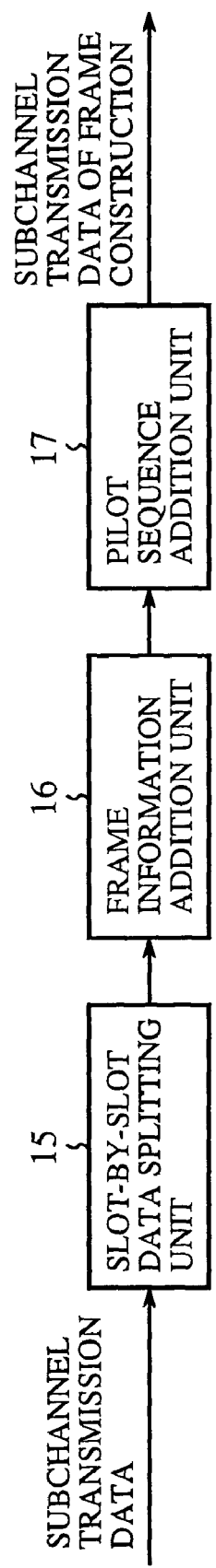
FIG. 3 is a block diagram showing a construction of a frame generation unit according to the first embodiment.
Figure 4:
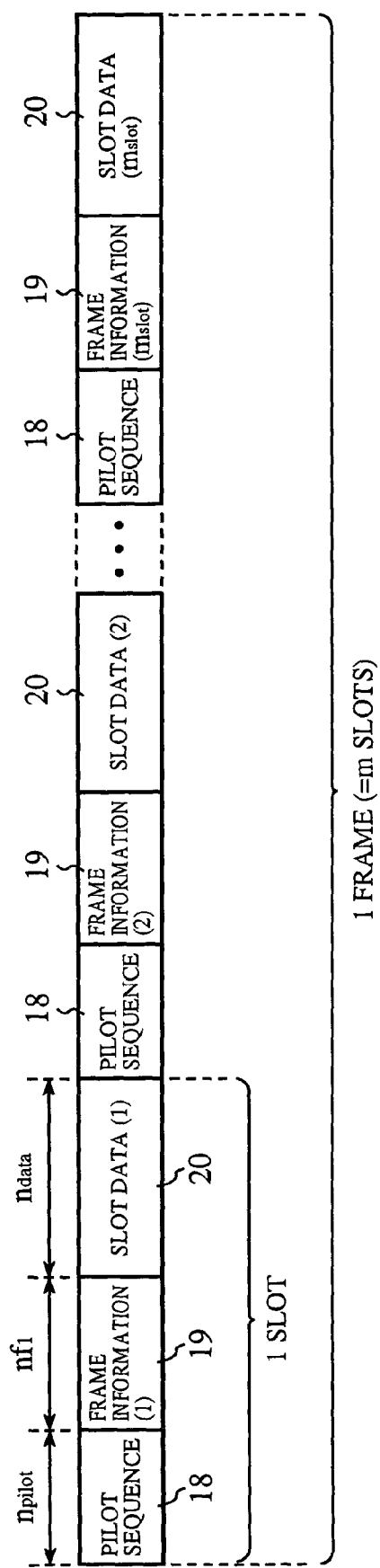
FIG. 4 shows a construction of a frame of transmitted data according to the first embodiment.

The first subchannel transmission data supplied to the subchannel modulation processing unit 4a is converted by the frame generation unit 5 into data constituting a frame. FIG. 3 is a block diagram showing a construction of the frame generation unit 5. Referring to FIG. 3, the frame generation unit 5 comprises a slot-by-slot data splitting unit 15 for splitting the subchannel transmission data into data sets each having a predetermined length, a frame information addition unit 16 adding frame information comprising control information and the like to the split subchannel transmission data, a pilot sequence addition unit 17 adding predetermined data (hereinafter, referred to as pilot sequence) to the split subchannel transmission data. FIG. 4 shows a construction of a frame of transmission data generated by the frame generation unit 5. The subchannel transmission data is split by the slot-by-slot data splitting unit 15 so as to produce slot data 20 of a predetermined symbol length $n_{data}$. The frame information addition unit 16 adds frame information 19 (symbol length $n_{fi}$) to the split data. The frame information 19 is configured as control information required in a modulation process and a demodulation process, including a coding rate for convolution coding in the convolution encoder 1, the number of rows and columns in the interleaver 2, the level of multiplexing, i.e. the number of subchannels M determined by the modulation controller 12, the number of subcarriers for frequency hopping per subchannel and the sequence of serial-to-parallel conversion of the transmission data. The receiver is notified accordingly.

The pilot sequence addition unit 17 adds a pilot sequence 18 with a symbol length of $n_{pilot}$ to form a slot. A total of m slots are combined to construct a frame. The number of slots m constructing a frame, the symbol length $n_{data}$, $n_{fi}$ and $n_{pilot}$ as well as the pilot sequence are predetermined constants that are designated by the modulation controller 12 for the subchannel modulation processing units 4a, 4b, . . . 4c.

The data modulation unit 6 subjects subchannel transmission data of a frame structure as described above to data modulation. According to the first embodiment, the data modulation unit 6 subjects the subchannel transmission data to QPSK modulation and outputs the result of modulation to the time-spreading unit 7.

The time-spreading unit 7 subjects the subchannel transmission data subjected to data modulation to time-spreading. Prior to the time-spreading process in the time-spreading unit 7, the modulation controller 12 selects a time-spreading code. The time-spreading code may be a Hadamard-Walsh code characterized by excellent orthogonality. The selected code is set in all of the subchannel modulation processing units 4a, 4b, . . . 4c. The time-spreading code is inserted in the frame information 19 shown in FIG. 4. The receiver is also notified of the same time-spreading code. The transmitter and the receiver forming a pair use the same time-spreading code for operation. The time-spreading code 7 subjects the subchannel transmission data to time-spreading by multiplying the subchannel transmission data subjected to data modulation by the time-spreading code.

The data hopping unit 8 converts the subchannel transmission data subjected to time-spreading into a plurality of subcarrier transmission signals to be transmitted according to the frequency-hopping scheme. A description will be given of a signal processing in the data hopping unit 8.

Figure 5:
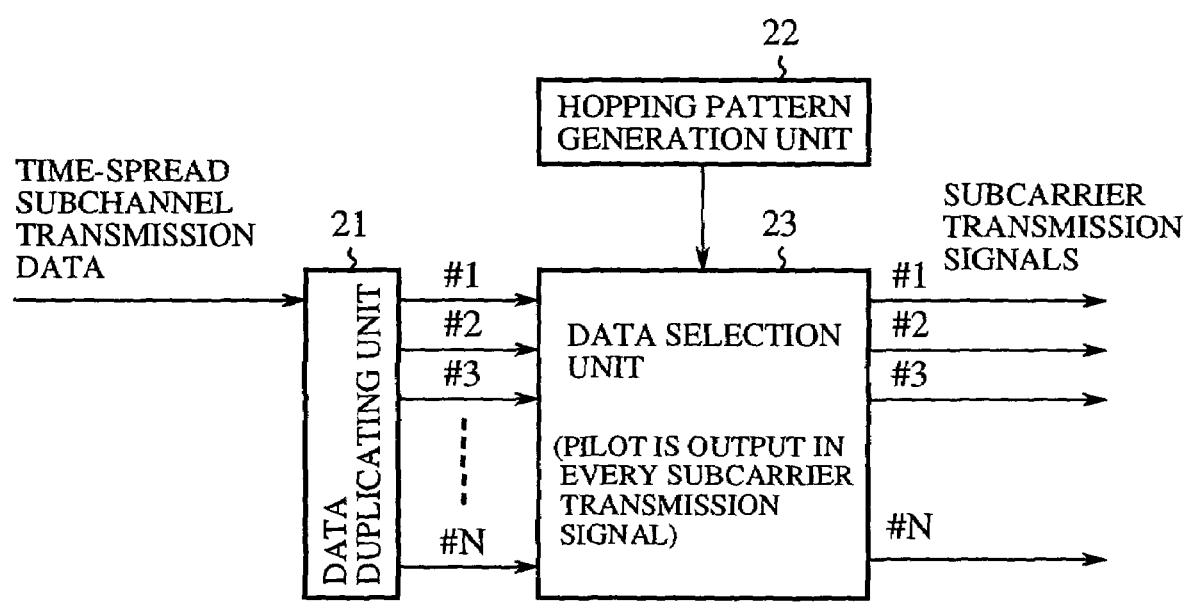
FIG. 5 is a block diagram showing a construction of a data hopping unit according to the first embodiment.

FIG. 5 is a block diagram showing a construction of the data hopping unit 8. Referring to FIG. 5, the data hopping unit 8 comprises a data duplicating unit 21 for duplicating subchannel transmission data for a plurality of signal frequency bands (hereinafter, referred to as subcarriers) for frequency hopping, a hopping pattern generation unit 22 designating a subcarrier for frequency hopping, a data selection unit 23 for selecting transmission data for a subcarrier designated by the hopping pattern generation unit 22 and outputting a plurality of subcarrier transmission signals to be transmitted using respective subcarriers.

The modulation controller 12 designates, for the data duplicating unit 21, the number of subcarriers N for frequency hopping in a given subchannel. The data duplicating unit 21 receives the subchannel transmission data subjected to time-spreading and reproduces a total of N (=the number of subcarriers) sets of subcarrier transmission data.

Figure 6:
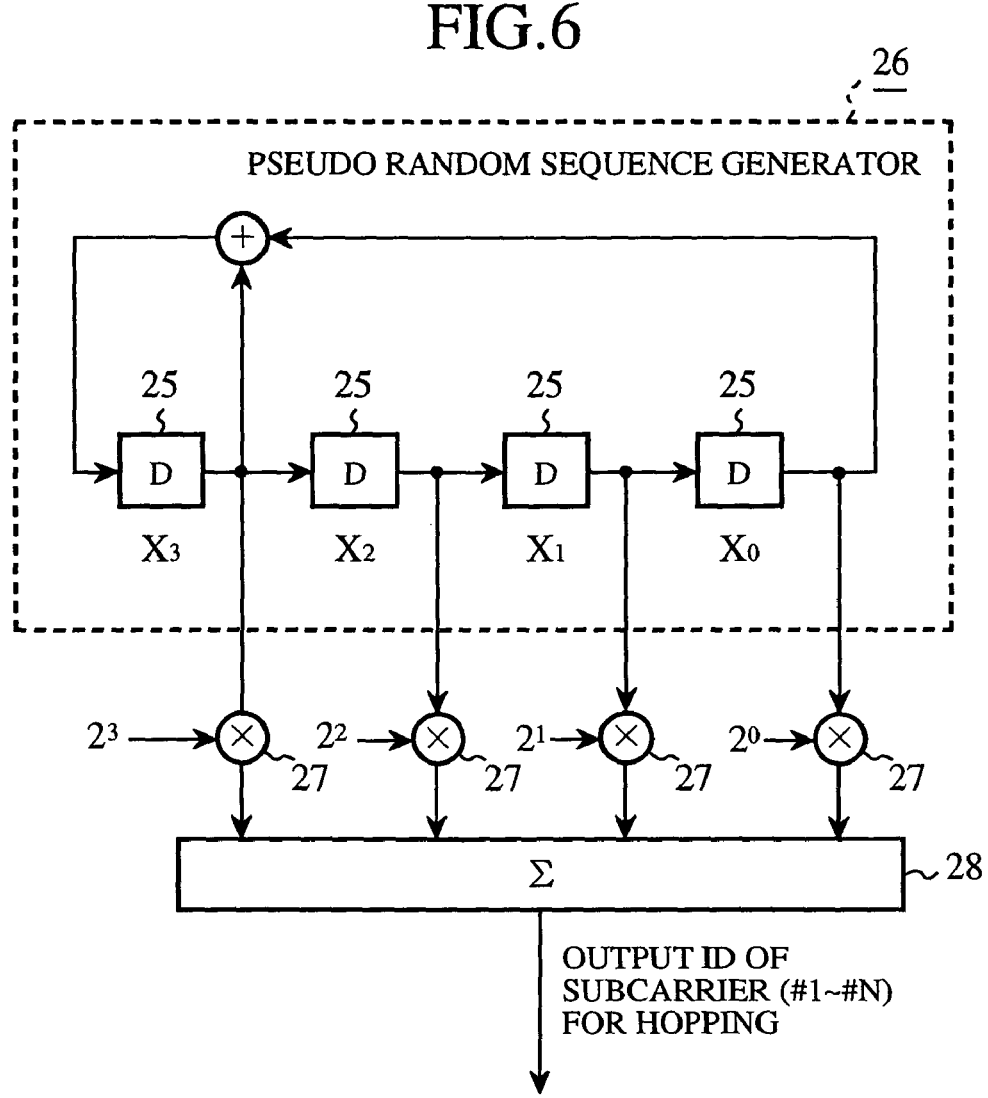
FIG. 6 is a block diagram showing a construction of a hopping pattern generating unit according to the first embodiment.

The hopping pattern generation unit 22 generates a subcarrier ID for designating a subcarrier, of a total of N subcarriers, in which the subcarrier transmission data is output according to frequency hopping. FIG. 6 is a block diagram showing a construction of the hopping pattern generation unit 22. The hopping pattern generation unit 22 comprises a random sequence generation unit 26 constructed, for example, by four shift registers 25, a total of 4 multipliers 27 assigning a predetermined weight to a data value in each of the shift registers 25 and an adder 28 adding outputs from the multipliers 27 so as to output the ID of a subcarrier for frequency hopping.

A description will now be given of the hopping pattern generation unit 22.

FIG. 6 is a block diagram showing a construction of a hopping pattern generation unit 22. Referring to FIG. 6, the shift registers 25 are provided in a pseudo random sequence generator, the pseudo random sequence generator 26 generates the ID of a subcarrier for frequency hopping, the adders 27 connected to as many shift registers 25 and the multiplier 28 summing the outputs from the multipliers 27.

A description will now be given of the operation according to the first embodiment. Prior to communication, initial values determined by the modulation controllers 12 are set in the shift registers 25 of the random sequence generator 26. The initial values in the shift registers 25 define a frequency-hopping pattern for hopping between subcarriers. The initial value in the shift register 25 is inserted in the frame information 19 shown in FIG. 4 so as to notify the receiver of the same initial value.

Each of the multipliers 27 multiplies the value held in the shift register 25 by a corresponding weight. For example, the leftmost multiplier 27 in FIG. 6 multiplies the value held in the shift register 25 in the first stage by a weight $2^3$. The rightmost multiplier 27 multiplies the value held in the shift register 25 in the last stage by a weight $1$ ($=2^0$). The adder 28 calculates a sum of the outputs from the multipliers 27 so as to output the sum as the ID of a subcarrier for hopping.

When the transmitter starts a process of modulating the transmission data, the pseudo random sequence generator 26 barrel-shifts the values held in the shift registers 25 at a predetermined hopping rate $R_H$. As a result, the ID's of subcarriers for hopping are output from the hopping pattern generator 22 in the form of a hopping pattern switched at the hopping rate $R_H$. The hopping pattern is a PN sequence in nature. Assuming that a total of k shift registers 25 are provided, the sequence length (hopping pattern length) is $2^k-1$ (in the foregoing example, k=4 so that the sequence length=7). By constructing the pseudo random sequence generator 26 as shown in FIG. 6, an M sequence characterized by a sharp autocorrelation peak is generated as a hopping pattern. The number of stages k of the shift registers 25 and the multipliers 27 is set such that the hopping pattern length ($2^k-1$) is equal to the number of subcarriers N set by the modulation controller 12.

The data selection unit 23 receives the N subcarrier transmission data sets reproduced by the data duplication unit 21. The data selection unit 23 selects the subcarrier transmission data for transmission in accordance with the hopping pattern output from the hopping pattern generation unit 22 so as to generate a plurality of subcarrier transmission signals for transmission in respective subcarriers. A description will now be given of how the data selection unit 23 selects the subcarrier transmission data with reference to FIG. 7.

Figure 7:
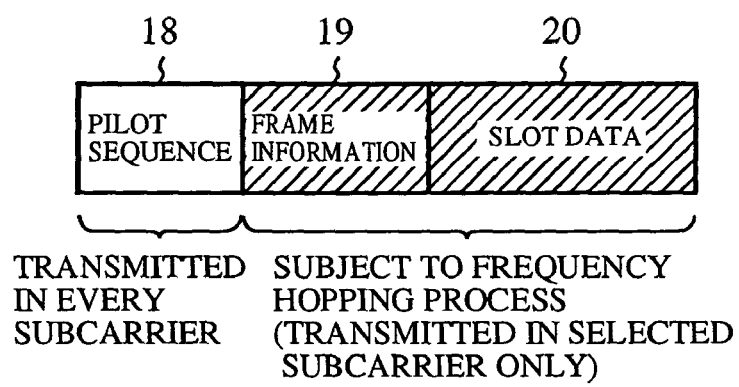
FIG. 7 shows a data area in subcarrier transmission data subject to frequency hopping according to the first embodiment.

FIG. 7 shows how a data area subject to frequency hopping is contained in the subcarrier transmission data. The data area is included in the slot shown in FIG. 4.

For the pilot sequence 18, the data selection unit 23 does not make selection of the subcarrier transmission data and outputs instead the entirety of N subcarrier transmission data sets as the subcarrier transmission signals.

For the frame information 19 and the slot data 20, the data selection units 23 outputs as a subcarrier transmission signal only the subcarrier transmission data associated with the selected subcarrier ID, in accordance with the hopping pattern output from the hopping pattern generation unit 22. Simultaneously, the subcarrier signals other than that associated with the selected subcarrier ID are prevented from being output and held to a zero output level.

As described above, when the N subcarrier signals are output from each of the subchannel modulation processing units 4a, 4b, . . . 4c for the respective M subchannels, the inverse Fourier transform unit 9 subjects the (N×M) subcarrier signals received to inverse Fourier transform, combines the signals and outputs the combined signal to the frequency converter 10.

Figure 8:
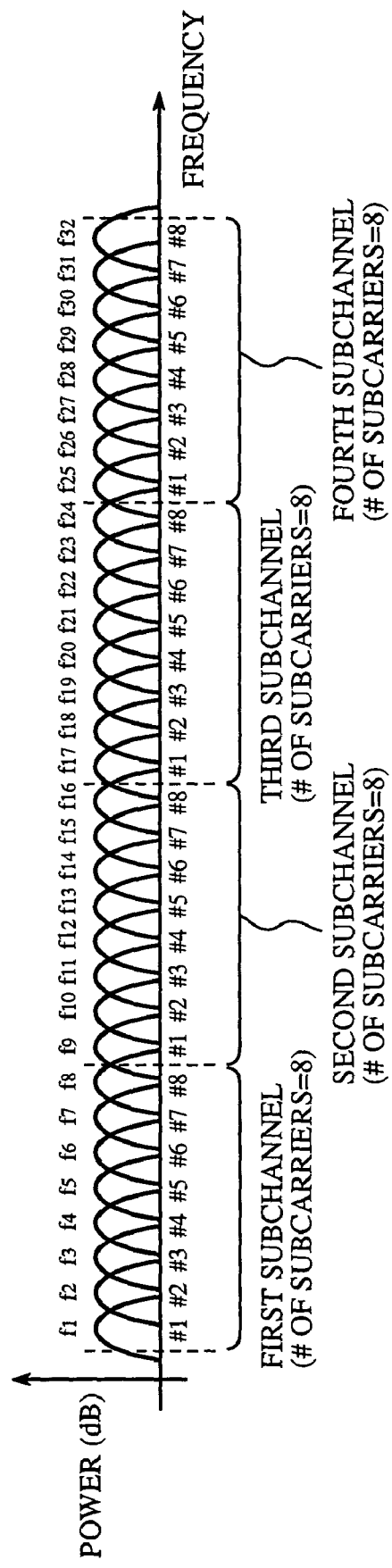
FIG. 8 shows a subcarrier assignment effected after inverse Fourier transform according to the first embodiment.

FIG. 8 shows how frequency assignment of a total of (N×M) subcarrier signals subjected inverse Fourier transform by the inverse Fourier transform unit 9. Referring to FIG. 8, the frequency of a subcarrier is plotted horizontally and the power of a subcarrier is plotted vertically. It is assumed here that a total of 32 subcarriers ($f_1$-$f_{32}$) are used for transmission and the modulation controller 12 sets the number of subchannels M=4 and the number of subcarriers per subchannel N=8. The 8 subcarrier transmission signals output from the first subchannel modulation processing unit 4a are assigned by the inverse Fourier transform unit 9 to the subcarriers $f_1$-$f_8$, for frequency-hopping spectrum-spreading. Similarly, the subcarrier transmission signals output from the second subchannel modulation processing unit 4b are assigned to the subcarriers $f_9$-$f_{16}$, the subcarrier transmission signals output from the third subchannel modulation processing unit (not illustrated in FIG. 2) are assigned to the subcarriers $f_{17}$-$f_{24}$ and the subcarrier transmission signals output from the fourth subchannel modulation processing unit (not illustrated in FIG. 2) are assigned to the subcarriers $f_{25}$-$f_{32}$. The signals are independently subject to frequency-hopping spectrum-spreading.

FIG. 9 shows how transmission signals output from inverse Fourier transform unit 9 are assigned to subcarriers in the first subchannel. While the pilot sequence 18 constituting a slot shown in FIG. 4 is being output, the data is transmitted using the entirety of subcarriers, as shown in FIG. 9(a). In contrast, while the frame information 19 or the slot data 20 is being output, the transmission data is output only using a subcarrier selected by the hopping pattern generation unit 22, as shown in FIG. 9(b). The transmission power of the other subcarriers is maintained at zero. When the subcarrier ID output from the hopping pattern generation unit 22 is changed, the subcarrier for carrying the subchannel transmission data subjected to inverse Fourier transform is changed accordingly. As a result, frequency-hopping spectrum-spreading using a total of N subcarriers is effected.

The transmission data for respective subchannels are subject to spectrum spreading using mutually different subcarriers. Accordingly, a total of M sets of subchannel transmission data subjected to spectrum spreading are multiplexed into in a transmission signal output from the inverse Fourier transform unit 9.

Figure 10:
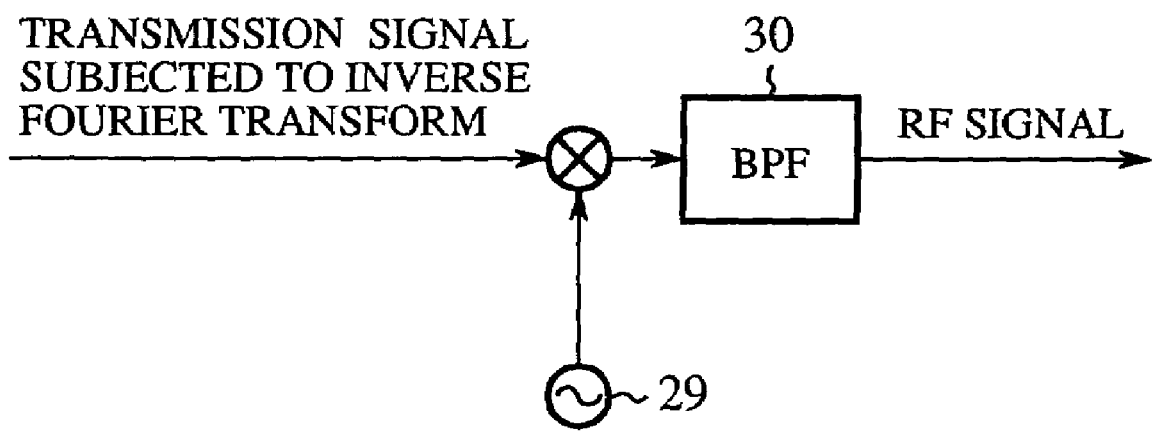
FIG. 10 is a block diagram showing a construction of a frequency converter provided in a transmitter according to the first embodiment.

FIG. 10 is a block diagram showing a construction of the frequency converter 10. Referring to FIG. 10, the frequency converter 10 comprises a frequency oscillator 29 for outputting a desired carrier frequency signal and a band-pass filter (BPF) 30 for removing frequency components other than those of a desired RF band from the transmission signal subjected to frequency conversion.

A description will now be given of the operation of the frequency converter 10 shown in FIG. 10. The frequency converter 10 receives the transmission signal output from the inverse Fourier transform unit 9 and up-converts the transmission signal into an RF signal by multiplying the input signal by the carrier frequency signal output from the frequency oscillator 29. The BPF 30 provides band-rejection and outputs an RF signal by removing the frequency components other than the those of the desired RF band from the transmission signal subjected to up-conversion. The RF signal output from the frequency conversion unit 10 is output to a transmission channel via the antenna 11.

Figure 11:
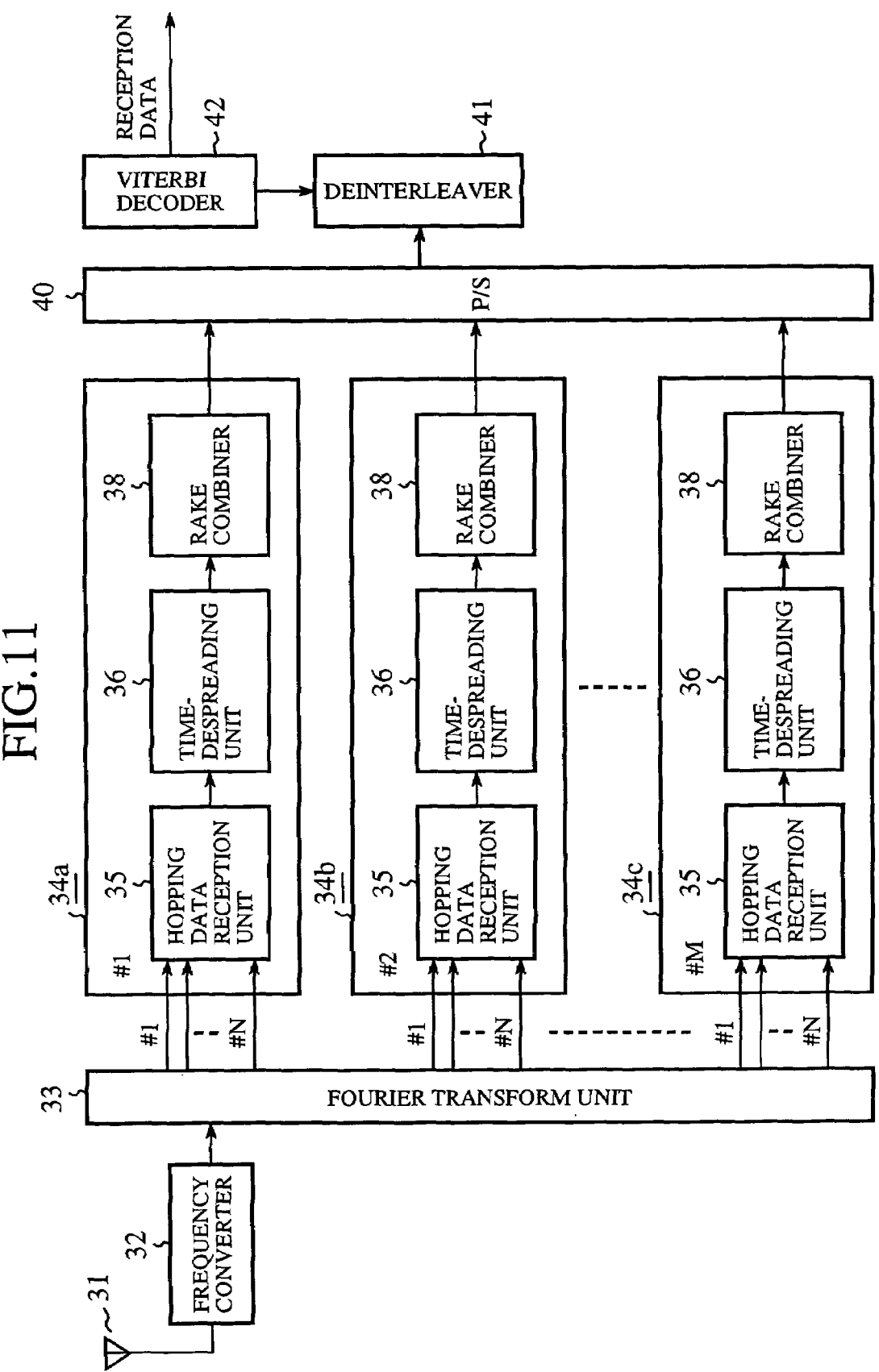
FIG. 11 is a block diagram showing a construction of a receiver for a frequency-hopping spread-spectrum communication system according to the first embodiment.

FIG. 11 is a block diagram showing a construction of a receiver for a spread-spectrum communication system according to the first embodiment. Referring to FIG. 11, the receiver comprises a frequency converter 32 for down-converting the RF signal received via an antenna 31, a Fourier transform unit 33 for subjecting the received signal thus down-converted to Fourier transform so as to retrieve a total of N subcarrier reception signals in each of a total of M subchannels.

The receiver also comprises subchannel demodulation processing units 34a, 34b and 34c for independently demodulating the subcarrier reception signals thus retrieved. Although FIG. 11 only shows the subchannel demodulation processing units 34a, 34b and 34c, the system actually comprises a sufficient number of subchannel demodulation processing units 34a, 34b, . . . 34c capable of parallel processing of the subchannel transmission data in a total of M subchannels. Each of the subchannel demodulation processing units 34a, 34b, . . . 34c comprises a hopping data reception unit 35 for selecting a subcarrier signal in accordance with a frequency-hopping pattern from frequency-hopped subcarrier signals carried in a total of N subcarriers and outputting the selected signal as reception data in that subchannel. A time-despreading unit 36 multiplies the selected reception data by a predetermined spreading code for time-despreading. A RAKE combiner unit 36 subjects the subchannel reception data output from the time-despreading unit 36 to RAKE combination and outputs the resultant subchannel reception data.

A parallel-to-serial conversion unit (hereinafter, referred to as P/S) 40 subjects the reception data for a total of M subchannels output from the subcarrier demodulation processing units 34a, 34b, . . . 34c to parallel-to-serial conversion so as to produce a single reception data set (serial signal) through combination. A deinterleaver 41 rearranges the order of the reception data. A Viterbi decoding unit 42 corrects errors in the deinterleaved reception data and outputs the corrected data.

A description will now be given of the operation of the receiver shown in FIG. 11. The frequency converter 32 receives via the antenna 31 an RF signal affected by frequency-selective fading on a transmission channel.

Figure 12:
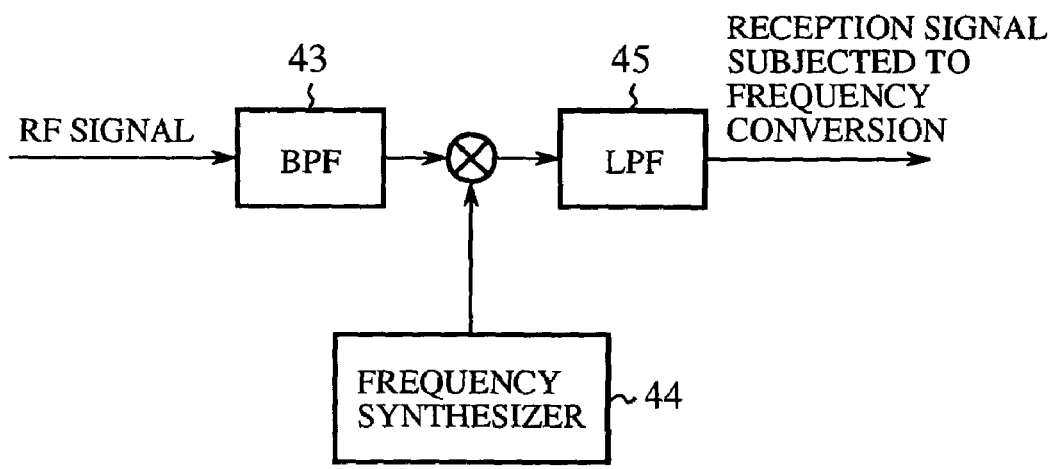
FIG. 12 is a block diagram showing a construction of a frequency converter provided in the receiver according to the first embodiment.

FIG. 12 is a block diagram showing a construction of the frequency converter 32. Referring to FIG. 12, a band-pass filter (hereinafter, referred to as BPF) 43 removes undesired frequency components from the received RF signal. A frequency synthesizer 44 outputs a carrier frequency signal. A low-pass filter (hereinafter, referred to as LPF) 45 shapes the pulse by removing high-frequency components and outputs a reception signal. The RF signal input to the frequency converter 32 has undesired frequency components removed therefrom by the BPF 43. Subsequently, the RF signal is multiplied by a carrier frequency signal output from the frequency synthesizer 44 for frequency conversion. The LPF 45 shapes the pulse so that the resultant reception signal is output from the frequency converter 32.

The reception signal output from the frequency converter 32 shown in FIG. 11 is supplied to the Fourier transform unit 33. The Fourier transform unit 33 isolates frequencies in the reception signal through Fourier transform so as to retrieve a total of N×M subcarrier reception signals (reception signals carried by the N subcarriers in each of the M subchannels). The Fourier transform unit 33 is capable of a Fourier transform outputs commensurate with the total number of subcarriers (N×M) in a frequency band shared by the transmitter and the receiver.

Subsequently, each of the subchannel demodulation processing units 34a, 34b, . . . 34c receives the N subcarrier reception signals for the subchannel for demodulation. Since the processes performed by the subchannel demodulation processing units 34a, 34b, . . . 34c are the same, only the operation of the first subchannel demodulation processing unit 34a modulating the first subchannel transmission data will be described and the description of the operations of the other subchannel demodulation processing units 34a, 34b, . . . 34c is omitted.

The N subcarrier reception signals input to the subchannel demodulation processing unit 34a are supplied to the hopping data selection unit 35.

Figure 13:
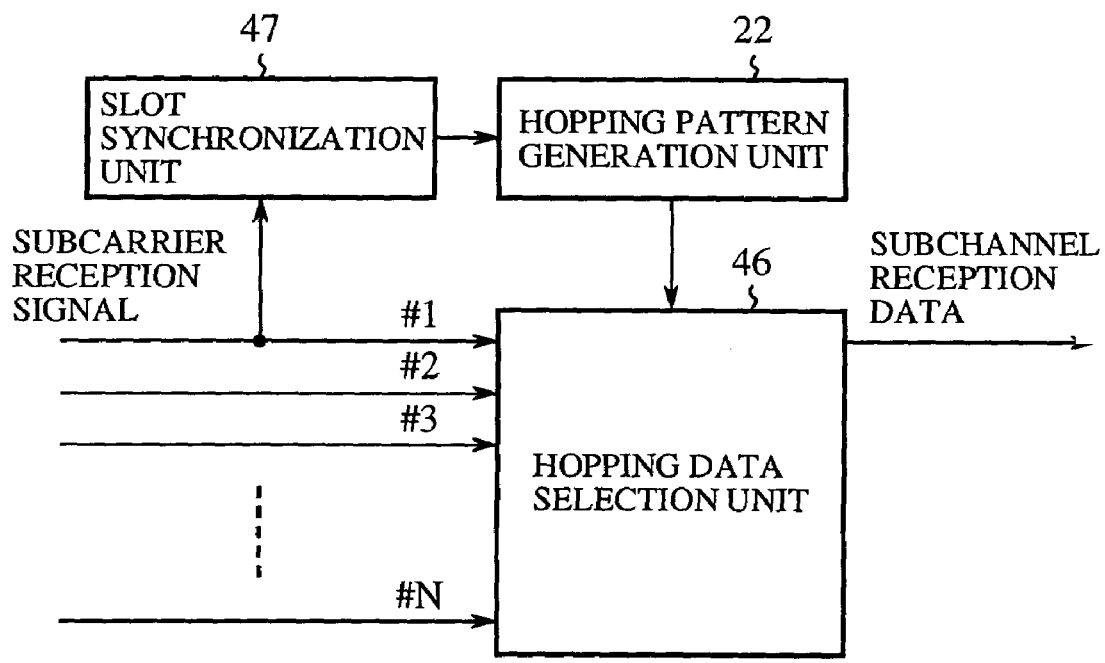
FIG. 13 is a block diagram showing a construction of a hopping data reception unit according to the first embodiment.

FIG. 13 is a block diagram showing a construction of the hopping data reception unit 35. Referring to FIG. 13, the hopping pattern generation unit 22 generates a hopping pattern for frequency hopping. A hopping data selection unit 46 selects a subcarrier reception signal in accordance with the hopping pattern output from the hopping pattern generation unit 22. A slot synchronization unit 47 detects a known pilot pattern in the input subcarrier reception signal so as to establish slot-based synchronization between the transmitter and the receiver. The construction of the hopping pattern generation unit 22 shown in FIG. 13 is the same as that of the hopping pattern generation unit 22 shown in FIG. 6 so that the description thereof is omitted.

When the subcarrier reception signal is supplied from the Fourier transform unit 33, the slot synchronization unit 47 monitors a subcarrier reception signal and establishes slot-based synchronization between the transmitter and the receiver by detecting the known pilot sequence 18 in the slot shown in FIG. 7. As described above, the transmitter does not subject the pilot sequence 18 to frequency hopping and transmits the entirety of subcarrier signals in parallel. Accordingly, the slot synchronization unit 47 is capable of establishing slot-based synchronization by monitoring any of the subcarrier reception signals for detection of the pilot sequence 18. In the illustrated construction of the hopping data reception unit 35 shown in FIG. 13, the slot synchronization unit 47 receives only the first subcarrier reception signal for establishment of synchronization between the transmitter and the receiver.

Prior to communication, the modulation controller 12 of the transmitter sets an initial value in the shift register 25 of the hopping pattern generation unit 22 of the receiver. The same initial value is set in the registers 25 of the transmitter and the receiver. When the receiver starts reception and the slot synchronization unit 47 establishes synchronization, the hopping pattern generation unit 22 of the receiver generates a hopping pattern switched at the predetermined hopping rate $R_H$ according to the scheme already described. Since the construction of the hopping pattern generation unit 22 of the transmitter is the same as that of the receiver and the same initial value is set in the registers 25 of the transmitter and the receiver, the same hopping pattern is generated in the transmitter and the receiver.

The hopping data selection unit 46 receives a total of N frequency-hopping spectrum-spread subcarrier reception signals supplied to the subchannel demodulation processing unit 34a and performs a process as described below so as to output spectrum-despread (concentrated) subchannel reception data recovered from frequency-hopping. While the hopping data reception unit 35 is receiving the pilot sequence 18, the hopping data selection unit 46 selects only one of the total of N subcarrier reception signals (in the example illustrated in FIG. 13, the first subcarrier reception signal) and outputs the selected signal as the pilot sequence 18 of the reception data.

Subsequently, while the hopping data reception unit 35 is receiving the frame information 19 or the slot data 20 constituting a slot, the hopping data selection unit 46 selects one of the N subcarrier reception signals in accordance with the hopping pattern generated by the hopping pattern generation unit 22 of the receiver so as to output the selected signal as subchannel reception data. Since the same hopping pattern is employed in the transmitter and the receiver, the hopping data selection unit 46 of the receiver is capable of selecting the frequency-hopped subcarrier reception signal properly so as to output spectrum-despread subchannel reception data recovered from frequency-hopping from the hopping data reception unit 35. The subchannel reception data thus output from the hopping data reception unit 35 is supplied to the time-despreading unit 36 shown in FIG. 11.

The time-despreading unit 36 holds a replica of the time-spreading code used in a time-spreading process in the time-spreading unit 7 of the transmitter. The time-despreading unit 36 multiplies the subchannel reception data by the time-spreading code for time-despreading. The subchannel reception data subjected to time-despreading is output to the RAKE combiner 38. The subchannel reception data is affected by multipath propagation occurring in a transmission channel in which a plurality of delay paths are involved. The RAKE combiner 38 subjects the input subchannel reception data to a RAKE combination process so that the adverse effects from multipath propagation are eliminated. Described above is the operation of the subchannel demodulation processing unit 34a.

The M subchannel reception data sets output from the subchannel demodulation processing units 34a, 34b, ... 34c are supplied to the P/S 40. The P/S 40 retrieves the slot data 20 from the subchannel reception data having a frame construction shown in FIG. 4. The slot data 20 retrieved from the entirety of M subchannel reception data sets are combined to produce a single reception data set.

The P/S 40 retrieves the frame information 19 from the subchannel reception data sets so as to read out control information required in a demodulation process. The control information may include a coding rate used for convolution coding in the transmitter, the number of rows and columns in the interleaver 2, the level of multiplexing, i.e. the number of subchannels M, the number of subcarriers used in one subchannel, the sequence of serial-to-parallel conversion of the transmission data, the time-spreading code used in the time-spreading process and the initial value set in the shift register 25 of the hopping pattern generation unit 22. The control information is set in the Fourier transform unit 33, the subchannel demodulation processing unit 34a, 34b, ... 34c, the P/S 40, the deinterleaver 41 and the Viterbi decoding unit 42.

The reception data output from the P/S 40 is subject to deinterleaving by the deinterleaver 41. The deinterleaver 41 is provided with a memory of the same number of rows and columns as the interleaver 2 of the transmitter 2. For example, original data before interleaving by the interleaver 2 of the transmitter is recovered by storing the reception data in successive rows of the memory (latitudinally) and reading the reception data thus stored latitudinally. The reception data output from the deinterleaver 41 is supplied to the Viterbi decoding unit 42 for an error correction process using a Viterbi code, based on a coding rate established between the transmitter and the receiver. The reception data subjected to error correction is output as user data.

In the first embodiment, a description is given above of the construction and the operation in which a total of N subcarriers are used per subchannel for frequency hopping. It is not necessary for all of the subchannels to use the same number of subcarriers N. The number of subcarriers may differ from subchannel to subchannel for respective frequency hopping.

In the first embodiment, a description is given above of a configuration in which the QPSK modulation scheme is used to modulate data output from the frame generation unit and the receiver demodulates accordingly. The data modulation scheme may not be the QPSK modulation scheme. Other schemes for data modulation may also be used.

In the first embodiment, a description is given above of a configuration in which the hopping pattern generation unit 22 provided in the transmitter and the receiver is provided with the pseudo random sequence generator 26, the multipliers 27 and the adder 28. The hopping pattern having a nature of a PN sequence is generated by barrel-shifting values set in the shift registers 25. Alternatively, other configurations may be employed. For example, the hopping pattern generation unit 22 may be provided with a memory storing hopping patterns so that the transmitter and the receiver store the same hopping patterns. The ID of a subcarrier for hopping may be switched at a predetermined hopping rate $R_H$ and output when transmitting data.

Thus, according to the first embodiment, a plurality of subcarrier transmission data sets are produced in a transmitter by duplicating transmission data. A subcarrier for transmission of data is selected in accordance with a hopping pattern having a nature of a PN sequence and switched at a predetermined hopping rate $R_H$ so that the associated subcarrier transmission signal is transmitted. The signal level of the subcarrier transmission signals not transmitted is held at zero. The subcarrier transmission signals are subject to inverse Fourier transform for frequency-hopping spectrum spreading. In the receiver, a spread-spectrum reception signal is subject to Fourier transform to isolate each of a plurality of subcarrier reception signals. By selecting a subcarrier reception signal from the plurality of subcarrier reception signals in accordance with the hopping pattern, a frequency-hopping spectrum-despreading process is performed. Therefore, the frequency of a frequency synthesizer need not be switched for frequency hopping. The frequency switching wait time required for a stable operation of the frequency synthesizer is made unnecessary so that the frequency switching is performed efficiently and the efficiency of data transmission is improved. Another advantage is that it is possible to maintain the efficiency in data transmission even when the data transmission rate is increased and the hopping rate $R_H$ is increased accordingly.

In addition to the benefit of anti-fading performance available from frequency hopping, employing both frequency-hopping spectrum spreading and time-spreading spectrum spreading enables reduction in adverse effects from interference signals, thereby further improving the bit error performance and the quality of communication. The bit error performance is further improved by a path diversity effect enabled by RAKE combination.

By subjecting transmission data subjected to convolution coding to interleaving, splitting the transmission data into a plurality of subchannel transmission data sets through serial-to-parallel conversion, and individually subjecting the subchannel transmission data to frequency-hopping and time-spreading for parallel transmission, it is ensured that, even when a bit error rate in a particular subchannel temporarily becomes poor in a transmission environment seriously affected by interference, errors are spread as a result of a deinterleaving process in a receiver, thus enabling efficient error correction in a Viterbi decoding process. Therefore, degradation in the quality of communication is avoided.

Second Embodiment

In the receiver for a spread-spectrum communication system according to the second embodiment, each subchannel demodulation processing unit examines time-despread subchannel reception data to estimate a power of interference occurring in a transmission channel. By normalizing the subchannel reception data with the interference power before outputting the data for further processes, a favorable quality of communication is ensured even when the level of interference differs from subchannel to subchannel. The receiver according to the second embodiment only differs from the receiver according the first embodiment in that the interference power is estimated so that the subchannel reception data is normalized accordingly. The other aspects of the construction remains the same so that the description thereof is omitted by denoting the corresponding elements by the same reference numerals.

The transmitter used in the spread-spectrum communication system according to the second embodiment provides advantageous functions identical to those of the transmitter described in the first embodiment so that the description thereof is omitted.

A description will be given of the receiver for a spread-spectrum communication system according to the second embodiment.

Figure 14:
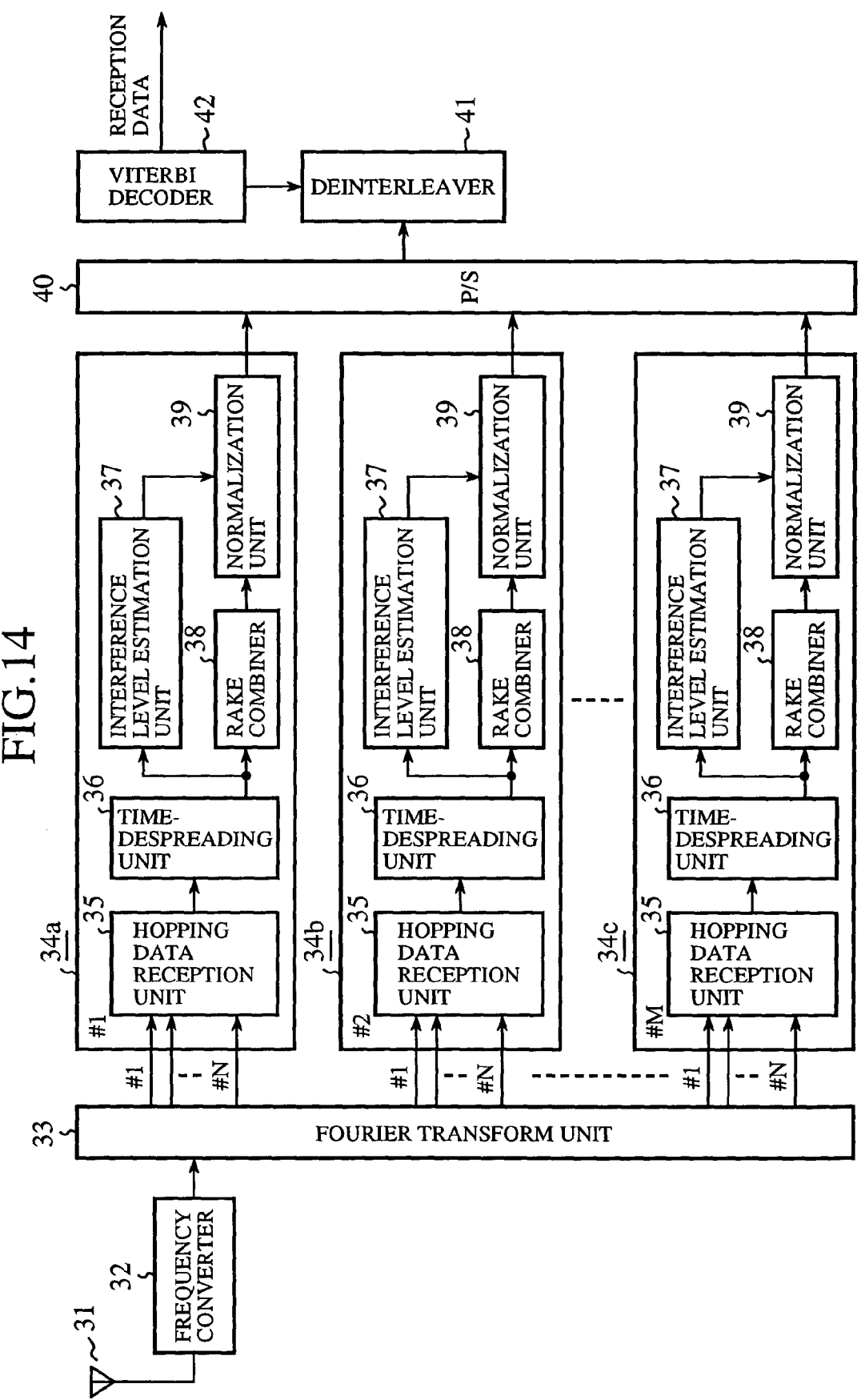
FIG. 14 is a block diagram showing a construction of a receiver for a frequency-hopping spread-spectrum communication system according to a second embodiment of the present invention.

FIG. 14 is a block diagram showing a construction of the receiver for a spread-spectrum communication system according to the second embodiment. Referring to FIG. 14, an interference level estimation unit 37 examines time-despread subchannel reception data to estimate by calculation the power of interference (hereinafter, referred to as interference power) affecting the subchannel. A normalization unit 39 normalizes the subchannel reception data subjected to RAKE combination.

Figure 15:
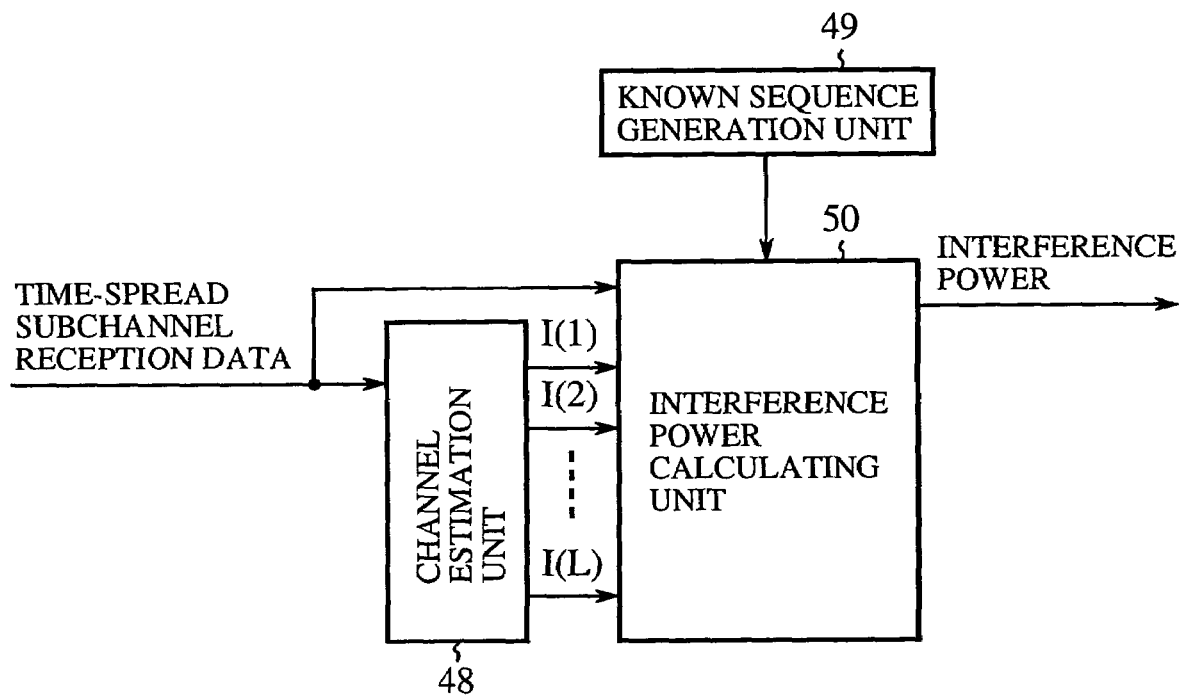
FIG. 15 is a block diagram showing a construction of an interference level estimation unit according to the second embodiment.

FIG. 15 is a block diagram showing a construction of the interference level estimation unit 37. Referring to FIG. 15, a channel estimation unit 48 provides channel estimation based on a pilot sequence included in the time-despread subchannel reception data. A known sequence generation unit 49 generates reference symbol data corresponding to the pilot sequence. An interference power calculating unit 50 calculates the interference power affecting the subchannel reception data, based on the result of channel estimation and the reference symbol data corresponding to the pilot sequence.

A description will now be given of the operation of the receiver shown in FIG. 14. The operations performed by the antenna 31, the frequency converter 32, the Fourier transform unit 33, the hopping data reception data unit 35 and the time-despreading unit 36 are the same as the corresponding operations in the receiver described in the first embodiment so that the description thereof is omitted. The time-despread subchannel reception data output from the time-despreading unit 36 is supplied to the RAKE combiner 38 so that adverse effects from multipath propagation involving delay waves are removed.

The time-despread subchannel reception data is supplied to the interference level estimation unit 37 so as to estimate the level of interference caused by multipath delay waves. The interference level estimation unit 37 estimates the level of interference caused by a total of L multipath delay waves of the entirety of multipath delay waves in the transmission channel, where L is a preset value. The channel estimation unit 48 of the interference level estimation unit 37 shown in FIG. 15 subjects the pilot sequence 18 (symbol length=$n_{pilot}$) included in the subchannel reception data to synchronous addition so as to calculate channel estimation values I(1)-I(L) relative to the L delay paths.

The known sequence generation unit 49 generates symbol data Ps(j) corresponding to the pilot sequence 18, where j indicates a numeral specifying the position of symbol data in the pilot sequence 18 (j=1–$n_{pilot}$). The reference symbol data Ps(j) has its magnitude normalized (|Ps(j)|=1).

The interference power calculating unit 50 calculates the interference power σ per slot in accordance with equation (1) below, based on the subchannel reception data, the channel estimation values I(1)-I(L) and the reference symbol data Ps(j).

$$\sigma = \frac{1}{n_{pilot}} \sum_{h=1}^{L} \sum_{j=1}^{n_{pilot}} |r(h, j) \cdot P_s^*(j) - I(h)|^2 \quad (1)$$

In equation (1), h indicates an identification of a delay wave, r(h, j) indicates symbol data of the pilot sequence included in the input subchannel reception data and Ps*(j) indicates a complex conjugate of Ps(j). The interference power calculating unit 50 examines the input subchannel reception data to calculate the interference power σ slot by slot and outputs the calculated power to the normalization unit 39 shown in FIG. 14.

The normalization unit 39 normalizes the subchannel reception data subjected to RAKE combination by the RAKE combination unit 38 with the level of interference from multipath delay waves. More specifically, the normalization unit 39 divides the data by the interference power σ and outputs the normalized data. The normalized subchannel reception data output from each of the subchannel modulation processing units 34a, 34b, . . . 34c is supplied to the P/S 40 as in the receiver described in the first embodiment. The deinterleaver 41 and the Viterbi decoding unit 42 perform respective operations and output the resultant reception data.

Thus, according to the second embodiment, by normalizing the subchannel reception data output from each of the subchannel modulation processing units 34a, 34b, . . . 34c with the level of interference from multipath delay waves, it is possible to recover the reception data in which the variation in the level of interference affecting the subchannel is canceled even when the level of interference caused by multipath propagation occurring in the transmission channel differs from subchannel to subchannel. Thereby, the quality of communication is maintained at a proper level.

Third Embodiment

In the first embodiment, the bit error performance is improved by processing the data for transmission using both frequency-hopping and time-spreading spectrum spreading using inverse Fourier transform. In the spread-spectrum communication system according to the third embodiment, the data is first subjected to frequency-hopping spectrum spreading using inverse Fourier transform in each subchannel. Subsequently, a guard interval is inserted to eliminate adverse effects from delay wave occurring in the transmission channel so that the bit error performance is improved.

The description that follows highlights the transmitter and the receiver of the spread-spectrum communication system according to the third embodiment. The transmitter and the receiver according to the third embodiment only differ from the transmitter and the receiver according to the first embodiment in the construction of the subchannel modulation processing units and the subchannel demodulation processing units. Further, the transmitter is provided with a GI addition unit for inserting a guard interval to the transmission data. The receiver is provided with a GI elimination unit for removing the guard interval from the reception data. The other aspects of the construction are the same as the corresponding aspects according to the first embodiment so that the description thereof is omitted by denoting the corresponding elements by the same reference numerals.

Figure 16:
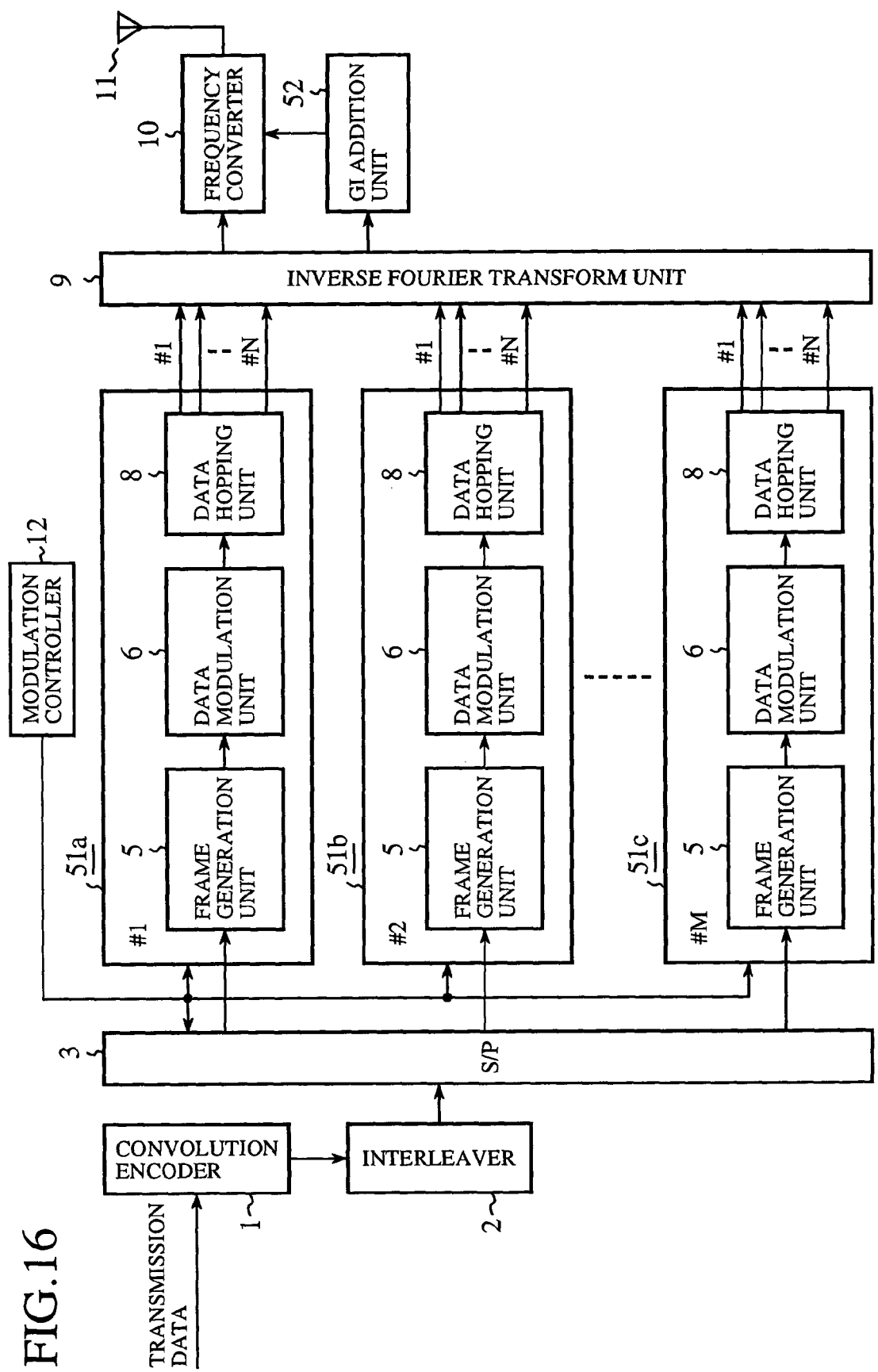
FIG. 16 is a block diagram showing a construction of a transmitter for a frequency-hopping spread-spectrum communication system according to a third embodiment of the present invention.

FIG. 16 is a block diagram showing a construction of the transmitter for a frequency-hopping spread-spectrum communication system according to the third embodiment.

Referring to FIG. 16, the transmitter comprises subchannel modulation processing units 51a, 51b and 51c for modulating subchannel transmission data output from the S/P 3. Although FIG. 16 only shows the subchannel modulation processing units 51a, 51b, 51c, a sufficient number of subchannel modulation processing units 51a, 51b, . . . 51c capable of parallel processing of a total of M sets of subchannel transmission data, where M is determined by the modulation controller 12, are provided. The transmitter further comprises a GI addition unit 52 for inserting a guard interval in the transmission signal subjected to inverse Fourier transform.

A description will now be given of the operation of the transmitter shown in FIG. 16. The convolution encoder 1, the interleaver 2 and the S/P 3 operate in the same manner as the first embodiment so that the description thereof is omitted. The M sets of subchannel transmission data output from the S/P 3 are output to the respective subchannel modulation processing units 51a, 52b, . . . 51c. Since the processes in the subchannel modulation processing units 51a, 51b, . . . 51c are identical with each other, the following description only highlights the operation of the first subchannel modulation processing units 51a so that the description of the other subchannel modulation processing units 51b, . . . 51c is omitted.

The subchannel reception data supplied to the subchannel modulation processing unit 51a is converted by the frame generation unit 5 to data of a frame structure as shown in FIG. 4. The subchannel reception data of a frame structure is subject to data modulation according to the QPSK modulation scheme by the data modulation unit 6. In the third embodiment, the subchannel transmission data output from the data modulation unit 6 is directly supplied to the data hopping unit 8.

The data hopping unit 8 reproduces a total of N sets of subchannel transmission data and selects the subcarrier transmission data in accordance with a predetermined hopping pattern. The selected subcarrier transmission data is output as a subcarrier transmission signal corresponding to the subcarrier, while the other subcarrier signals are held at a zero output level.

A total of M×N subcarrier transmission signals output from the subchannel modulation processing units 51a, 51b, . . . 51c are supplied to the inverse Fourier transform unit 9 so that the transmission signals subjected to inverse Fourier transform are output to the GI addition unit 52.

Figure 17:
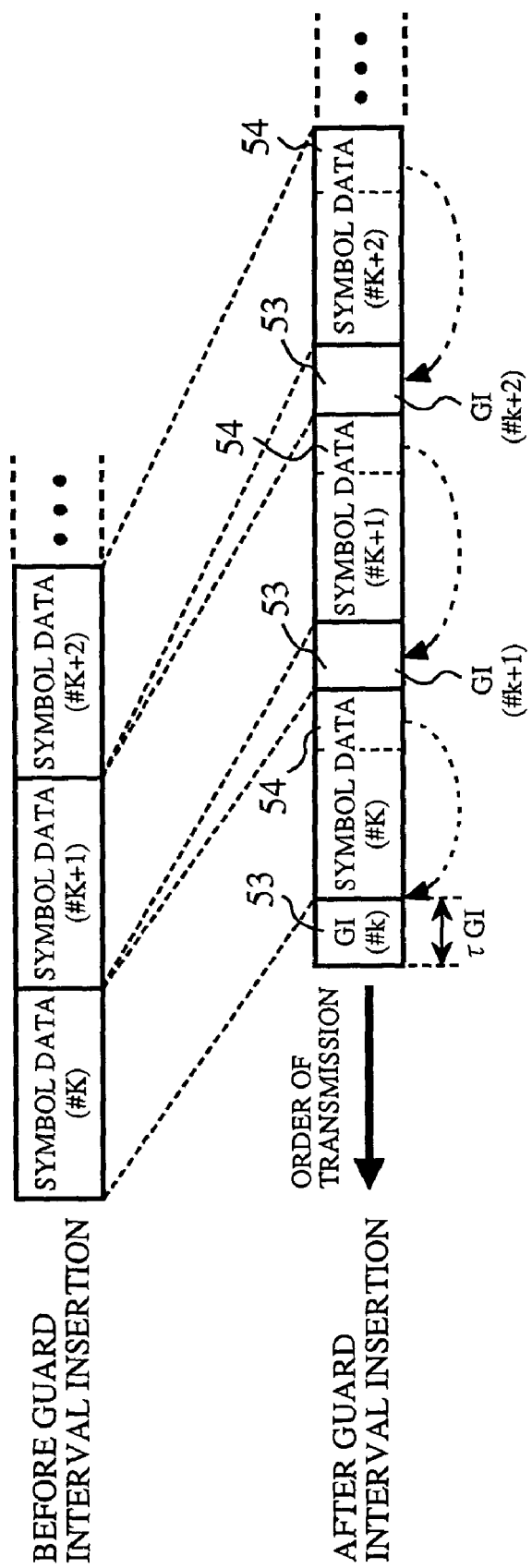
FIG. 17 is a schematic diagram showing a process of adding a guard interval in a GI addition unit according to the third embodiment.

FIG. 17 is a schematic diagram showing a process of adding a guard interval in the GI addition unit 52. The transmission signal is supplied to the GI addition unit 52 as consecutive subchannel transmission data subjected to data modulation by the data modulation unit 6. According to the third embodiment, the GI addition unit 52 inserts data 54 as a guard interval 53 at the head of the symbol data constituting the consecutive data set such that the data 54 is a replica of an end portion of the symbol data corresponding to a duration $\tau_{GI}$. For example, referring to FIG. 17, the GI addition unit 52 copies the data 54 corresponding to a duration $\tau_{GI}$ at the end of the kth symbol data (#k) and inserts the copied data at the head of the symbol data (#k) as the guard interval 53. Subsequently, the GI addition unit 52 processes the successively input symbol data in a similar manner so as to insert the guard interval 53 at the head of each symbol data. The data duration $\tau_{GI}$ of the data inserted as the guard interval 53 is preset to an appropriate level in consideration of a maximum delay time of the delay wave occurring in the transmission channel.

The transmission signal having the guard interval 53 inserted therein is subject to frequency conversion by the frequency converter 10 to produce an RF signal before being output to the transmission channel via the antenna 11.

Figure 18:
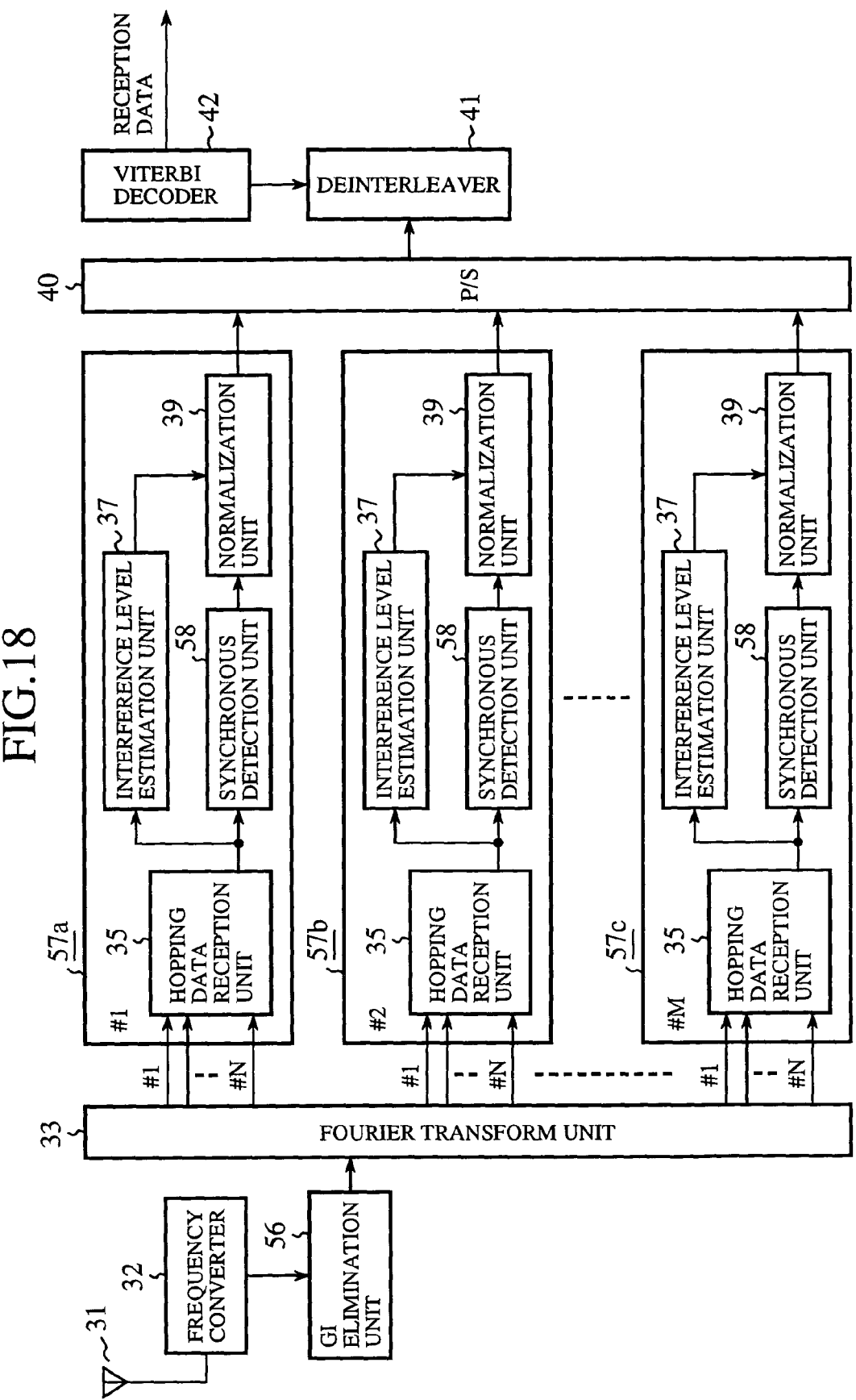
FIG. 18 is a block diagram showing a construction of a receiver for a frequency-hopping spread-spectrum communication system according to the third embodiment.

FIG. 18 is a block diagram showing a construction of a receiver for a spread-spectrum communication system according to the third embodiment. Referring to FIG. 18, the receiver comprises a GI elimination unit 56 for removing the guard interval from the reception signal output from the frequency converter 32. Subchannel demodulation processing units 57a, 57b and 57c receives subcarrier reception signals output from the Fourier transform unit and subjecting the signal to demodulation subchannel by subchannel. Although FIG. 18 shows only the subchannel demodulation processing units 57a, 57b and 57c, the system actually comprises a sufficient number of subchannel demodulation processing units 57a, 57b, . . . 57c capable of parallel processing of the subchannel transmission data in a total of M subchannels. A synchronous detection unit 58 subjects the subchannel reception data output from the hopping data reception unit 35 to synchronous detection.

A description will now be given of the operation of the receiver shown in FIG. 18. Since the processes in the subchannel demodulation processing units 57a, 57b, . . . 57c are identical with each other, the following description only highlights the operation of the first subchannel demodulation processing units 57a so that the description of the other subchannel demodulation processing units 57b, . . . 57c is omitted.

The reception signal subjected to frequency conversion by the frequency converter 32 is supplied to the GI elimination unit 52. The GI elimination unit 52 successively removes the guard interval inserted at the head of each symbol data in the received signal. By removing the guard interval in the GI elimination unit 52, the adverse effects from the delay wave affecting the guard interval portion is prevented. More specifically, intersymbol interference caused by collision between a rear edge of the delay wave derived from the previous symbol data and a front edge of the current symbol data is prevented. The reception signal having the guard interval removed therefrom is converted by the Fourier transform unit 33 into a total of N×M subcarrier reception signals.

Subsequently, the subcarrier demodulation processing unit 57a receives from the Fourier transform unit 33 a total of N subcarrier reception signals in the corresponding subchannel. The subcarrier reception signals are subject to spectrum despreading by the hopping data reception unit 35 and input to the synchronous detection unit 58 as subchannel reception data.

Figure 19:
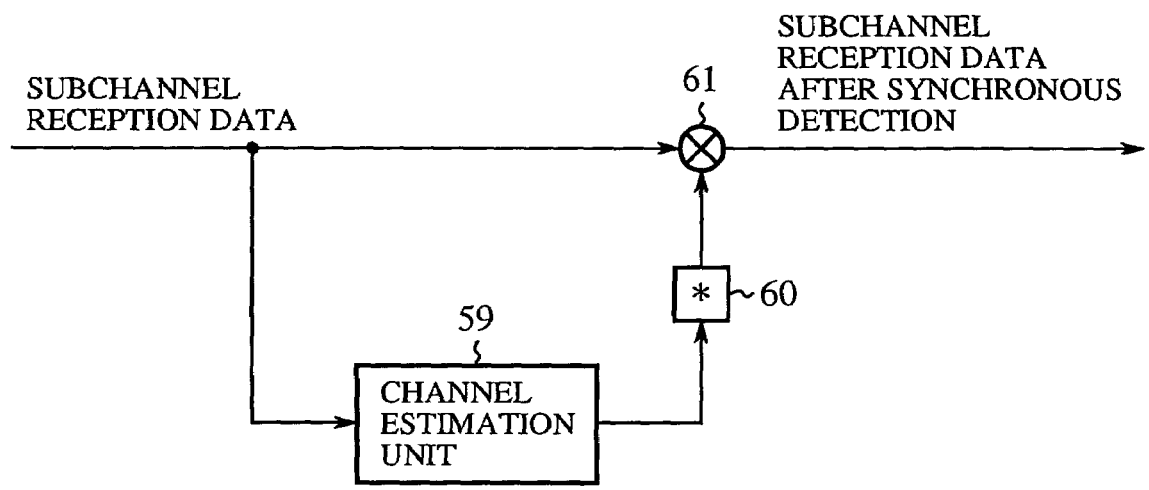
FIG. 19 is a block diagram showing a construction of a synchronous detection unit according to the third embodiment.

FIG. 19 is a block diagram showing a construction of the synchronous detection unit 58. Referring to FIG. 19, the synchronous detection unit 58 comprises a channel estimation unit 59 for channel estimation based on the pilot sequence included in the subchannel reception data. A complex conjugate calculating unit 60 calculates a complex conjugate of the channel estimation. A complex multiplier 61 assigns a weight to the subchannel reception data by multiplying the subchannel reception data by the complex conjugate and outputs the subchannel reception data subjected to synchronous detection.

The channel estimation unit 59 receives the subchannel reception data and calculates the channel estimation by performing synchronous addition of the known pilot sequence (symbol length=npilot) included in the data. The complex conjugate calculating unit 60 calculates a complex conjugate of the channel estimation. The complex calculating unit 61 subjects the subchannel reception data and the complex conjugate to complex multiplication and outputs the subchannel reception data subjected to synchronous detection.

The channel estimation unit 37 shown in FIG. 18 receives the subchannel reception data subjected to despreading and calculates a level of interference σ based on the pilot sequence included in the subchannel reception data. The normalization unit 39 obtains normalized subchannel reception data by dividing the subchannel reception data subjected to synchronous detection by the interference level σ and outputs the resultant normalized subchannel reception data.

According to the third embodiment, frequency-hopping spectrum spreading is employed in the operation of the transmitter and the receiver. Therefore, the frequency switching wait time is not required so that the frequency switching process is performed efficiently, thereby improving the data transmission efficiency.

By subjecting the frequency-hopped spectrum spread transmission signal to data modulation so as to produce symbol data and inserting a guard interval in each symbol data, adverse effects from a delay wave with a delay time shorter than the duration τGI of the guard interval are removed. Accordingly, in addition to the benefit of improvement in the communication quality owing to frequency-hopping spectrum spreading, a further advantage is available in that the bit error rate is improved.

Fourth Embodiment

The spread-spectrum communication system according to the fourth embodiment is configured such that the subcarrier frequencies for signal transmission and reception are spaced apart at predetermined intervals on a frequency axis. The transmitter according to the fourth embodiment operates in the same manner as the transmitter described in the first embodiment except that the subcarriers are spaced apart at predetermined intervals for operation. Like numerals are used to denote the components of the transmitter according to the fourth embodiment and the identical or corresponding components of the transmitter according to the first embodiment shown in FIG. 2 so that the description of the construction and operation is omitted. The receiver according to the fourth embodiment operates in the same manner as the receiver described in the second embodiment except that the subcarriers are disposed at predetermined intervals for operation. Like numerals are used to denote the components of the receiver according to the fourth embodiment and the identical or corresponding components of the receiver according to the second embodiment shown in FIG. 14 so that the description of the construction and operation is omitted.

Figure 20:
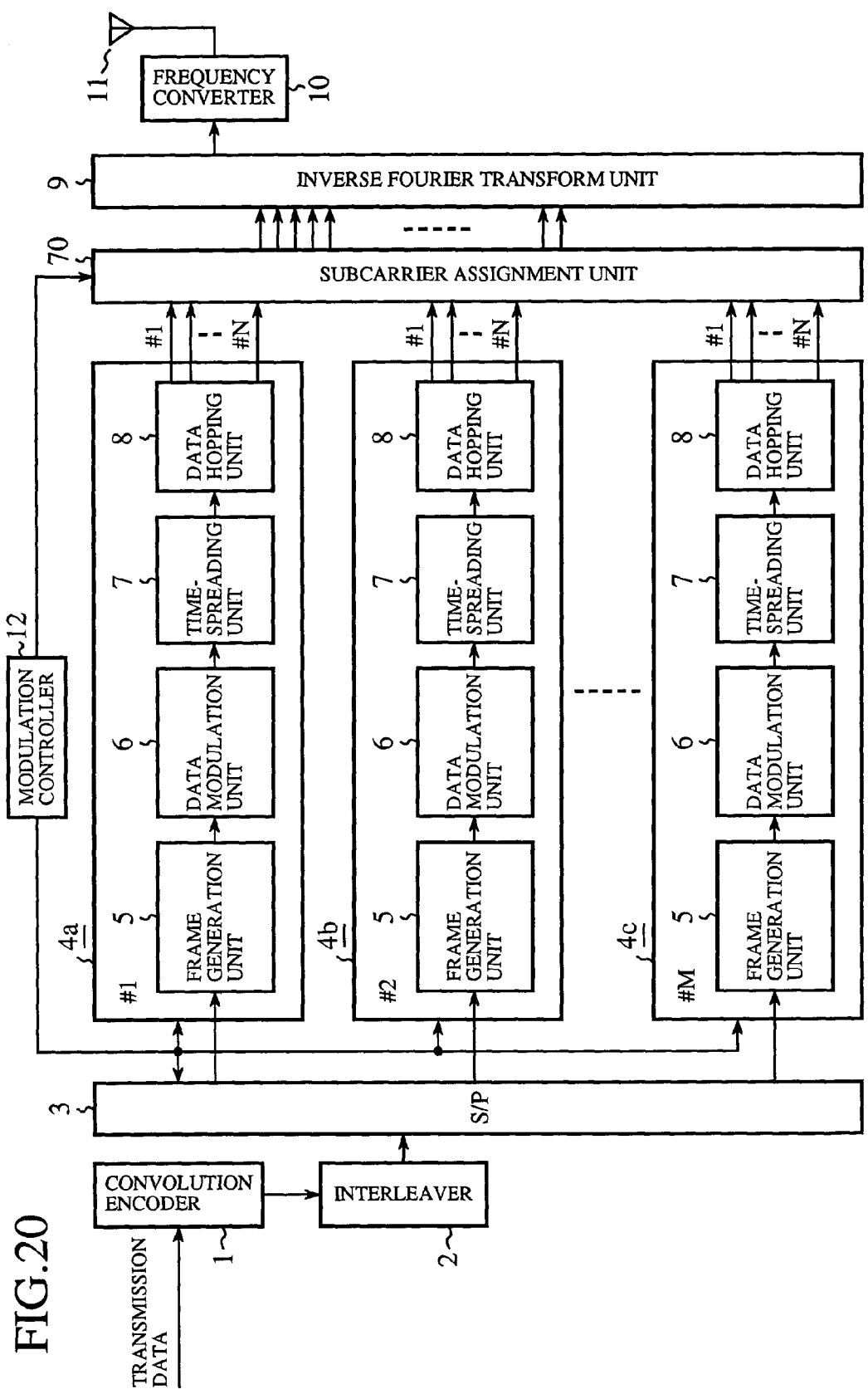
FIG. 20 is a block diagram showing a construction of a transmitter for a frequency-hopping spread-spectrum communication system according to a fourth embodiment of the present invention.

FIG. 20 is a block diagram showing a construction of a transmitter for a spread-spectrum communication system according to the fourth embodiment. Referring to FIG. 20, the transmitter comprises a subcarrier assignment unit 70 for rearranging the M×N subcarriers output from a total of M subchannel modulation processing units 4a, 4b, . . . 4c.

Figure 21:
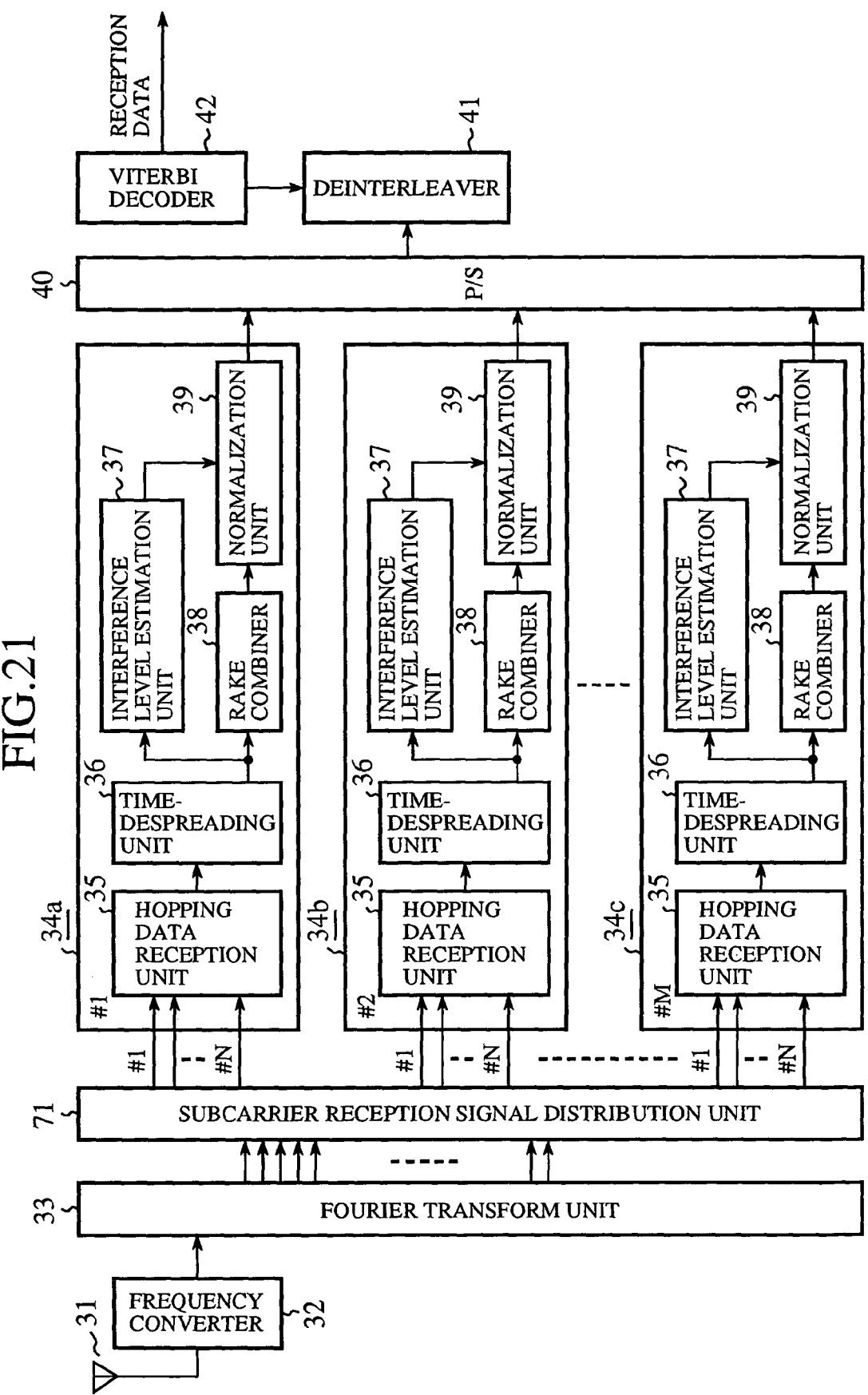
FIG. 21 is a block diagram showing a construction of a receiver for a frequency-hopping spread-spectrum communication system according to the fourth embodiment.

FIG. 21 is a block diagram showing a construction of a receiver for spread-spectrum communication system according to the fourth embodiment. Referring to FIG. 21, the receiver comprises a subcarrier reception signal distribution unit 71 for distributing the M×N subcarrier reception signals recovered as a result of inverse Fourier transform to the M subchannel modulation processing units 34a, 34b, . . . 34c. The spread-spectrum communication system illustrated here frequency-hops a total of 32 subcarriers $f_1$-$f_{32}$ adjacent to each other in a frequency domain such that a total of 4 subchannels (M=4) are used for parallel transmission of data and a total of 8 subcarriers (N=8) are used per subchannel.

A description will now be given of the operation of the spread-spectrum communication system according to the fourth embodiment. The convolution encoder 1, the interleaver 2 and the S/P 3 of the transmitter shown in FIG. 20 operate in the same manner as the first embodiment. The modulation controller 12 determines assignment of subcarriers used in each subchannel.

Figure 22:
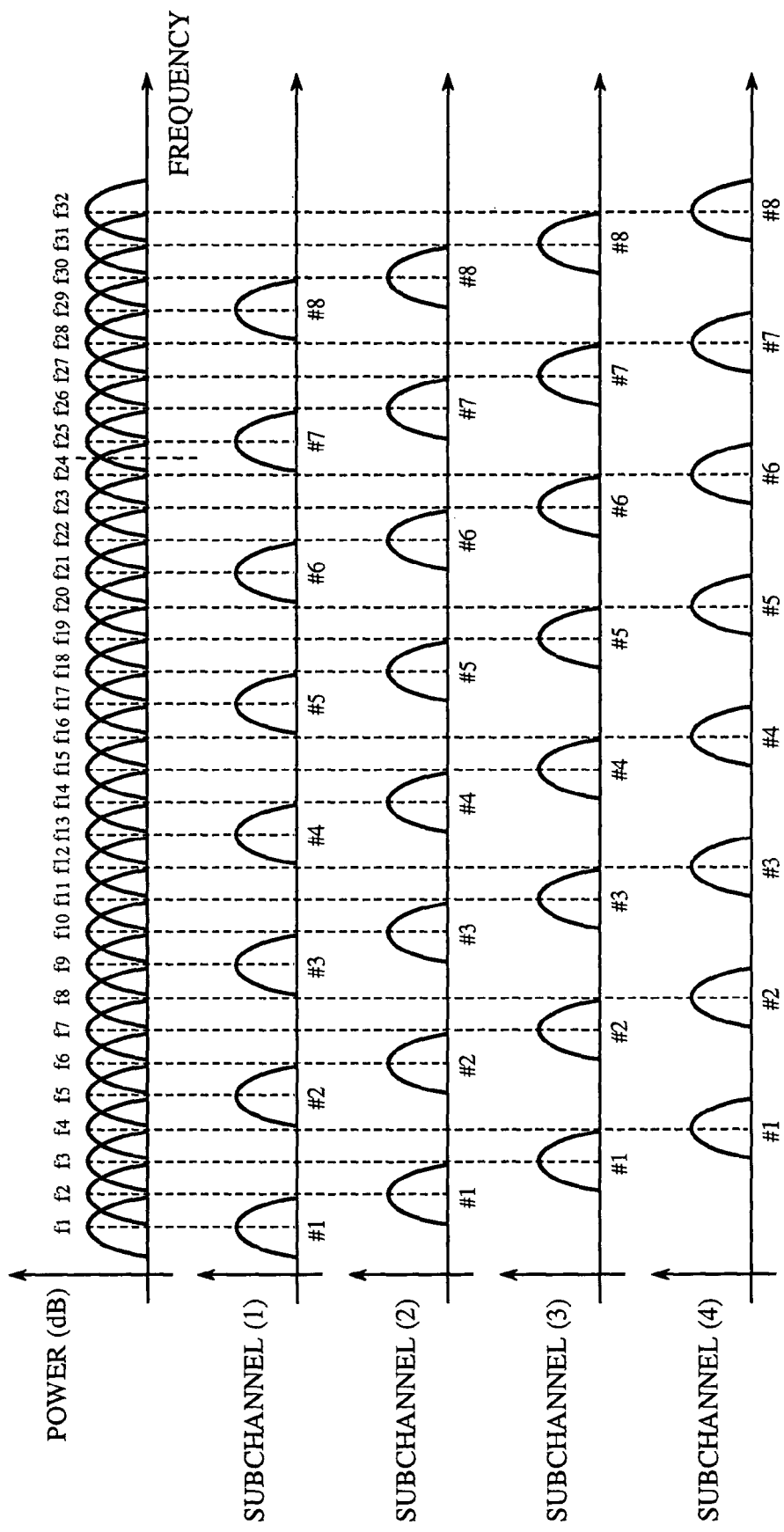
FIG. 22 shows arrangement of subchannels according to the fourth embodiment.

FIG. 22 shows arrangement of subchannels by the modulation controller 12 shown in FIG. 20. The modulation controller 12 distributes the subcarriers $f_1$-$f_{32}$ to the subchannels (1)-(4) to provide predetermined intervals between the frequencies such that a subchannel does not use subcarriers adjacent to each other in a frequency domain. In the example shown in FIG. 22, a total of 8 subcarriers $f_1$, $f_5$, $f_9$, $f_{13}$, $f_{17}$, $f_{21}$, $f_{25}$ and $f_{29}$ are assigned to the first subchannel (1) such that an interval of three subcarriers are provided between adjacent pairs of subcarriers. Similarly, the subcarriers $f_2$, $f_6$, $f_{10}$, f14, $f_{18}$, $f_{22}$, $f_{26}$ and $f_{30}$ are assigned to the second subchannel (2), the subcarriers $f_3$, $f_7$, $f_{11}$, $f_{15}$, $f_{19}$, $f_{23}$, $f_{27}$ and $f_{31}$ are assigned to the third subchannel (3), and the subcarriers $f_4$, $f_8$, $f_{12}$, $f_{16}$, $f_{20}$, $f_{24}$, $f_{28}$ and $f_{32}$ are assigned to the fourth subchannel (4).

The subcarrier assignment determined by the modulation controller 12 shown in FIG. 20 is provided to the subcarrier assignment unit 70 before transmission of data and also provided to the receiver as control information related to modulation and demodulation.

When the transmitter starts transmission of data, the subcarrier assignment unit 70 receives a total of 8 modulated subcarrier transmission signals from each of the subchannel modulation processing units 4a, 4b, . . . 4c. The subcarrier assignment unit 70 rearranges the 32 (=the number of subcarriers per channel (=8)×the number of subchannels (=4)) subcarrier transmission signals in accordance with the subcarrier assignment designated by the modulation controller 12 . For example, the transmission signal #1 in the first subchannel (1) is selected as data for transmission at the subcarrier f1 according to inverse Fourier transform. Subsequently, the first subcarrier transmission signal #1 in the second subchannel (2) is selected for transmission at the subcarrier f2, the first subcarrier transmission signal #1 in the third subchannel (3) is selected for transmission at the subcarrier f3, etc. The entirety of subcarrier transmission signals are arranged to correspond to the respective subcarriers in accordance with the subcarrier assignment. The arranged signals output to the inverse Fourier transform unit 9.

The inverse Fourier transform unit 9 subjects the 32 subcarrier transmission signals thus arranged to inverse Fourier transform and outputs the result of transform as transmission signals. The subchannel transmission data subjected to inverse Fourier transform is spectrum-spread according to the frequency-hopping scheme using a total of 8 subcarriers disposed at regular intervals in a frequency domain in accordance with the subcarrier assignment shown in FIG. 22. By subjecting subchannel transmission data for a subchannel to frequency hopping using a plurality of subcarriers not adjacent to each other, frequency-related correlation between subcarriers is reduced in level, thereby enhancing the efficacy of frequency diversity.

A description will now be given of the operation of the receiver shown in FIG. 21. The reception signal subjected to frequency conversion by the frequency converter 32 is subject to Fourier transform by the Fourier transform unit 33 so that a total of 32 subcarrier reception signals corresponding to the subcarriers $f_1$-$f_{32}$ are output. The subcarrier reception signal distribution unit 71 receives the subcarrier reception signals and distributes the subcarrier reception signals to respective subchannels in accordance with the subcarrier assignment provided by the modulation controller 12 of the transmitter. For example, a total of 8 subcarrier reception signals corresponding to the subcarriers $f_1$, $f_5$, $f_9$, $f_{13}$, $f_{17}$, $f_{21}$, $f_{25}$ and $f_{29}$ are output to the first subchannel demodulation processing unit 34a. The subchannel demodulation processing units 34a, 34b, . . . 34c, the P/S 40, the deinterleaver 41 and the Viterbi decoding unit 42 operate in the same manner as the second embodiment so as to output of the reception data.

In the description above of the fourth embodiment, it is assumed that the number of subcarriers used is 32, the number of subchannels is 4 and the number of subcarriers used per subchannel is 4. The number of subcarriers used, the number of subchannels used and the number of subcarriers per subchannel may not be confined to those of the example given. The same advantageous function is provided by other configurations.

As described above, according to the fourth embodiment, a plurality of subcarrier transmission signals in a subchannel frequency-hopped for transmission are transmitted using a plurality of subcarriers disposed at regular frequency intervals. Accordingly, by reducing frequency-related correlation between subcarriers in level, the efficacy of frequency diversity is enhanced and the communication quality is improved even when the transmission channel is seriously affected by frequency-selective fading.

Since the frequency-hopping spectrum spreading is employed in the operation of the transmitter and the receiver, the frequency switching wait time in the frequency synthesizer is not required so that switching between frequencies is performed efficiently and the data transmission rate is improved.

Fifth Embodiment

The receiver of the spread-spectrum communication system according to the fifth embodiment creates information relating to the quality of communication in each subchannel and provides the information to the transmitter. The transmitter determines the quality of communication in the transmission channel based on the information thus provided so as to switch between different numbers of subchannels used and different numbers of subcarriers per subchannel for subsequent transmission.

The receiver of the frequency-hopping spread-spectrum communication system according to the fifth embodiment is provided with a communication quality reporting unit 75 for providing the communication quality information to the transmitter. The receiver switches between different number of subcarriers per subchannel for signal exchange. The other aspects of the receiver construction are the same as the corresponding aspects of the receiver according to the second embodiment. The reception operation according to the frequency-hopping spread-spectrum scheme is performed in the same manner. Like numerals are used to denote the components of the receiver according to the fifth embodiment and the identical or corresponding components of the receiver according to the second embodiment so that the description of the construction and operation is omitted. The description that follows highlights calculation of interference power and reporting of the communication quality information by the receiver of the fifth embodiment.

The transmitter of the frequency-hopping spread-spectrum communication system according to the fifth embodiment is provided with a communication quality monitoring unit 76. The transmitter receives the communication quality information from the receiver so that signals are transmitted and received by switching between different numbers of subcarriers per subchannel. The other aspects of the construction and operation are identical to the corresponding aspects of the transmitter according to the first embodiment. The transmission operation according to the frequency-hopping spread-spectrum scheme is performed in a similar manner. Like numerals are used to denote the components of the transmitter according to the fifth embodiment and the identical or corresponding components of the transmitter according to the first embodiment so that the description of the construction and operation is omitted. The description that follows highlights processing of the information related to the communication quality and switching effected between the numbers of subcarriers.

Figure 23:
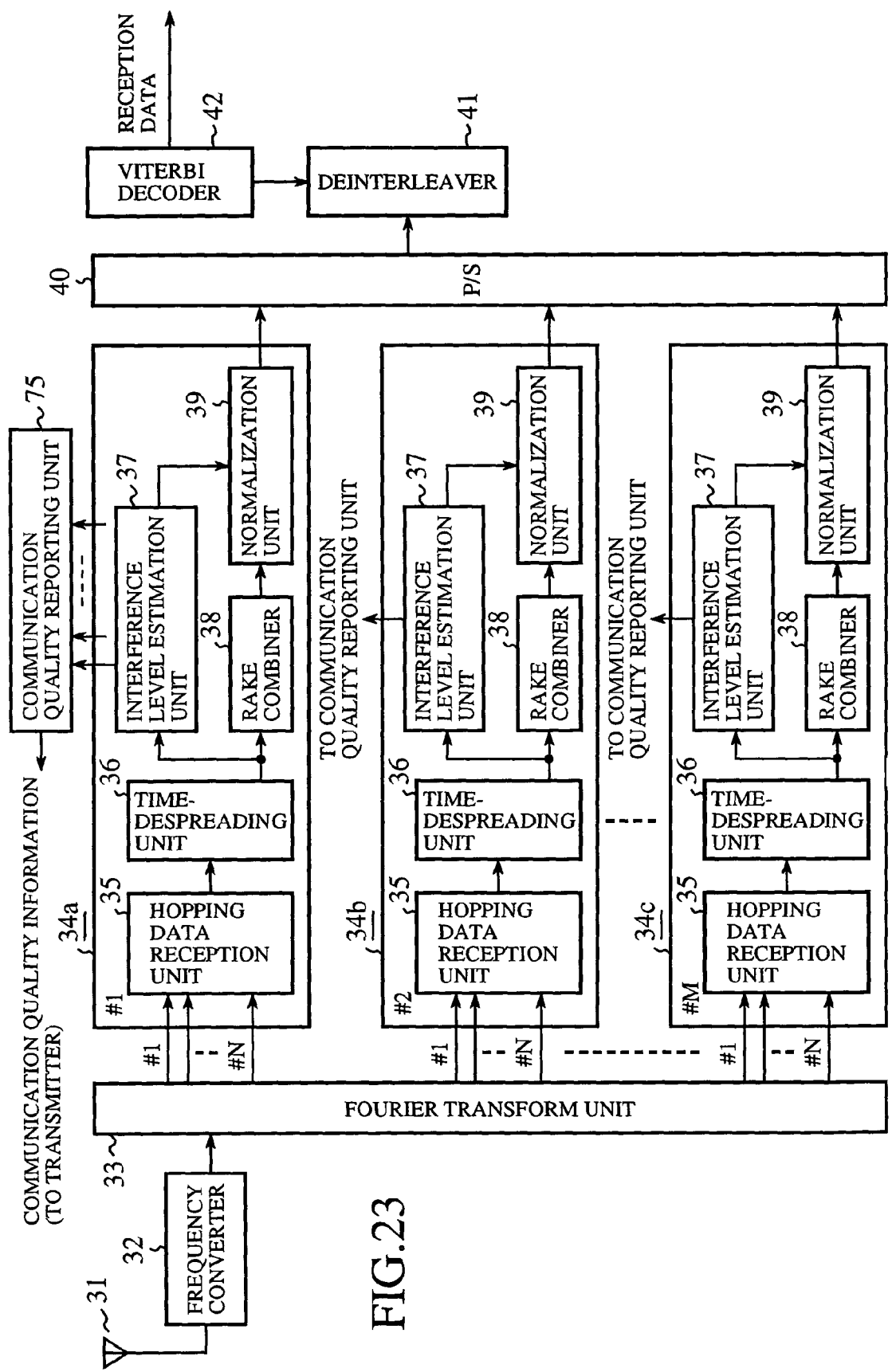
FIG. 23 is a block diagram showing a construction of a receiver for a frequency-hopping spread-spectrum communication system according to a fifth embodiment of the present invention.

FIG. 23 is a block diagram showing a construction of a receiver for a spread-spectrum communication system according to the fifth embodiment. Referring to FIG. 23, the receiver comprises a communication quality reporting unit 75 for receiving the interference power calculated by the interference level estimation unit 37 in the subchannel demodulation processing units 34a, 34b, . . . 34c and providing the communication quality information to the transmitter.

Figure 24:
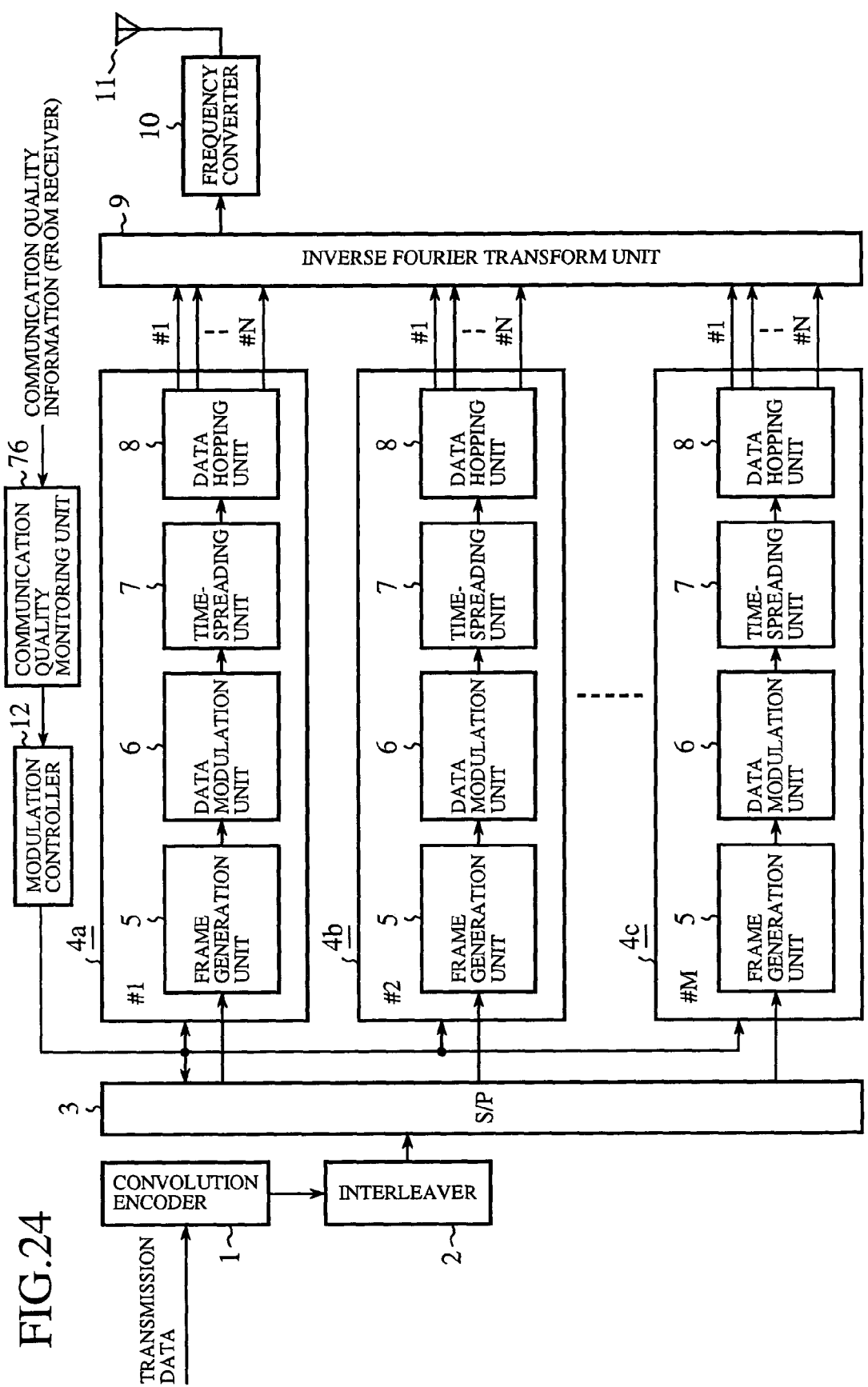
FIG. 24 is a block diagram showing a construction of a transmitter for a frequency-hopping spread spectrum communication system according to the fifth embodiment.

FIG. 24 is a block diagram showing a construction of a transmitter for a spread-spectrum communication system according to the fifth embodiment. Referring to FIG. 24, the transmitter comprises a communication quality monitoring unit 76 for receiving the communication quality information provided by the communication quality reporting unit 75 of the receiver, determining the quality of communication in the transmission channel and informing the modulation controller 12 in the transmitter accordingly.

A description will now be given of the operation of the receiver of the spread-spectrum communication system according to the fifth embodiment. The receiver processes the data it receives via the antenna 31 in the frequency converter 32 and the Fourier transform unit 33 in the same manner as the second embodiment. The subcarrier reception signals are supplied from the Fourier transform unit 33 to the subchannel demodulation processing units 34a, 34b, . . . 34c. The hopping data reception unit 35 and the time-despreading unit 36 in each of the subchannel demodulation processing units 34a, 34b, . . . 34c also operates in the same manner as the second embodiment. The interference level estimation unit 37 receives the time-despread subchannel reception data and calculates the interference power affecting the transmission channel. The interference level estimation unit 37 also calculates the signal power of the subchannel reception data, based on the pilot sequence 18 included in the subchannel reception data. Thus, those processes that are similar to the corresponding processes in the second embodiment are also performed in this embodiment. The interference level estimation unit 37 then divides the signal power of the reception data by the interference level so as to calculate a signal power to interference power ratio (hereinafter, referred to as SIR).

SIR calculated by the interference level estimation unit 37 in each of the subchannel demodulation processing units 34a, 34b, . . . 34c for each subchannel is provided to the communication quality reporting unit 75. The communication quality reporting unit 75 provides communication quality information to the transmitter that it is communicating with by transmitting SIR thereto.

A description will be given of the operation of the transmitter shown in FIG. 24.

The communication quality monitoring unit 76 provided in the transmitter receives the communication quality information provided by the communication quality reporting unit 75 of the receiver so as to retrieve SIR for each subchannel from the communication quality information and calculates an average SIR over the entirety of subchannels.

The communication quality monitoring unit 75 provided in the transmitter stores two threshold values for SIR, a relatively large SIR threshold value $\gamma_{hi}$ and a relatively small SIR threshold value $\gamma_{lo}$. The SIR threshold values $\gamma_{hi}$ and $\gamma_{lo}$ are set to a level appropriate for evaluation of the communication quality.

The communication quality monitoring unit 76 compares the average SIR with the threshold values $\gamma_{hi}$ and $\gamma_{lo}$ so as to evaluate the communication quality in the transmission channel. When the average SIR is larger than the large threshold value $\gamma_{hi}$, it is determined that the communication quality is favorable. When the average SIR is larger than the small threshold value $\gamma_{lo}$ and smaller than the large threshold value $\gamma_{hi}$, it is determined that the communication quality is medium. When the SIR is smaller than the small threshold value $\gamma_{lo}$, it is determined that the communication quality is poor. The result of determination on the communication quality is output to the modulation controller 12 shown in FIG. 24.

The modulation controller 12 shown in FIG. 24 stores a plurality of subcarrier assignment patterns. In accordance with the evaluation of communication quality, the number of subchannels M and the number of subcarriers N used per subchannel are switched into use so that the data transmission rate is changed.

Figure 25:
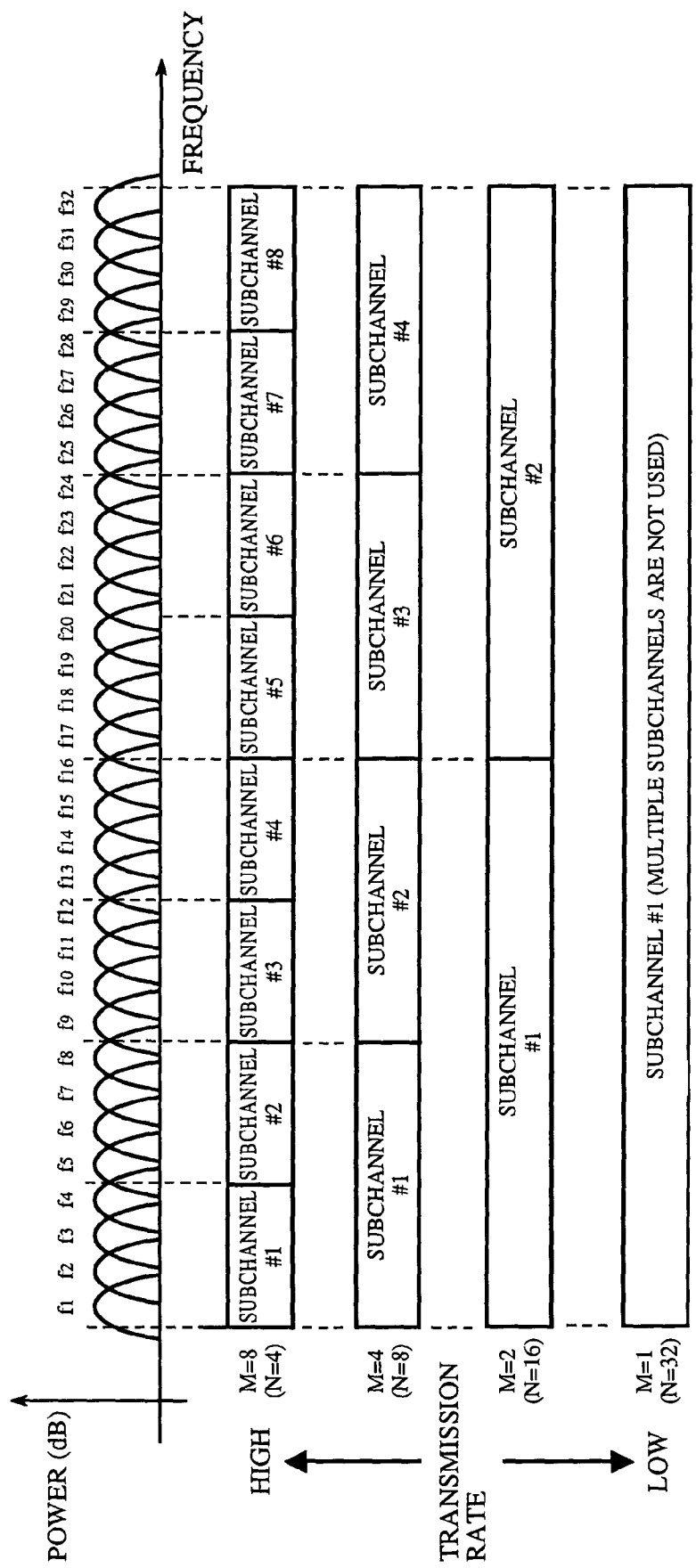
FIG. 25 shows a subcarrier assignment according to the fifth embodiment.

FIG. 25 shows a subcarrier assignment showing how different number of subchannels M and different number of subcarriers N may be switched into use. FIG. 25 shows how a total of 32 subcarriers $f_1$-$f_{32}$ are used for communication. The modulation controller 12 stores a variety of subcarrier assignment patterns in which the number of subchannels M and the number of subcarriers N per subchannel differ from pattern to pattern. More specifically, four subcarrier assignment patterns including a first pattern characterized by the number of subchannels M=8 (the number of subcarriers N=4 per subchannel), a second pattern characterized by M=4 (N=8), a third pattern characterized by M=2 (N=16) and a fourth pattern characterized by M=1 (N=32) are stored.

As the number of subchannels M is increased, the data transmission rate is increased and the number of subcarriers N is decreased, thereby causing the improvement in the transmission quality, a benefit of frequency-hopping spectrum spreading, to become less appreciable. In the example shown in FIG. 25, the transmission rate is maximized when the number of subchannels M=8. Conversely, the improvement in transmission quality due to frequency-hopping is maximized when the number of subchannels M=1.

The modulation controller 12 switches between subcarrier assignment patterns, based on the result of determination on the communication quality supplied by the communication quality monitoring unit 76. Assuming that, while communication is proceeding with the number of subchannels M=4 (the number of subcarriers N=8 per subchannel), for example, the modulation controller 12 is notified by the communication quality monitoring unit 76 that the communication quality is poor, a subchannel assignment pattern characterized by the number of subchannels M=2 (N=16), providing a better improvement in the communication quality and a smaller data transmission rate, is selected by switching from the current subcarrier assignment.

When a notification that the quality of communication is favorable is provided by the communication quality monitoring unit 76, the modulation controller 12 switches from the current subcarrier assignment to a subchannel assignment characterized by the number of subchannels M=8 (N=4) providing a higher data transmission rate and a poorer improvement in the communication quality.

When the modulation controller 12 receives a notification that the communication quality is medium, the modulation controller 12 maintains the current subcarrier assignment in which communication is proceeding.

When a new subcarrier assignment is selected as a result of switching, the modulation controller 12 provides the number of subchannels M and the number of subcarriers N selected to the S/P 3 and the subchannel modulation processing units 4a, 4b, . . . 4c. The number of subchannels M and the number of subcarriers N are also inserted in the frame information 19 of the subcarrier reception data shown in FIG. 4 so as to be provided to the subchannel demodulation processing units 34a, 34b, . . . 34c and the P/S 40 of the receiver. The components receiving the notification regarding the subcarrier assignment from the modulation controller 12 effects frequency-hopping spectrum spreading using a new subcarrier assignment for communication between the transmitter and the receiver.

The communication quality monitoring unit 76 is described in the fifth embodiment as determining the communication quality of the transmission channel, based on the average SIR of the subchannels. Alternatively, the determination may be made based on the minimum SIR of the subchannels.

In the fifth embodiment, the communication quality information is described as being created from SIR of each subcarrier. Alternatively, other signals capable of enabling a determination on the communication quality of the transmission channel such as the number of error bits corrected by the Viterbi decoding unit 42 may be used to provide the same advantageous function.

Thus, according to the fifth embodiment, the receiver provides the communication quality information to the transmitter so that the transmitter selects an appropriate subcarrier assignment adapted for the communication quality information for switching between data transmission rates. Accordingly, the data transmission rate may be reduced and the improvement in communication quality due to frequency hopping is enhanced when the effects from interference are serious and the communication quality is poor. Conversely, when the communication quality is favorable, the number of subcarriers used may be increased and the data transmission rate may be increased. Thus, the data transmission rate and the improvement in communication quality are suitably controlled depending on the communication quality observed.

INDUSTRIAL APPLICABILITY

As described above, the transmitter, the receiver and the modulation and demodulation method of the spread-spectrum communication system according to the invention are capable of spectrum spreading with a high hopping rate, thereby enabling data communication in which the data transmission rate is high and the communication quality is high.

The invention claimed is:

1. A transmitter for a spread-spectrum communication system in which transmission data is subject to spectrum spreading using a predetermined number of subcarriers, the transmitter comprising:
   a frame generation unit configured to construct a frame by inserting a predetermined pilot sequence in the transmission data;
   a data hopping unit including
      1) a hopping pattern generating unit including at least one multiplier and configured to generate a hopping pattern of a predetermined sequence length and switched at a predetermined hopping frequency, the hopping pattern designating a subcarrier for frequency hopping, and
      2) a data selection unit configured to output a plurality of subcarrier transmission signals corresponding to the plurality of subcarriers, respectively, by receiving the transmission data and outputting as a subcarrier transmission signal only the transmission data carried in a subcarrier designated by the hopping pattern, while maintaining the other subcarrier transmission signals at a zero output level; and
   an inverse Fourier transform unit configured to subject the entirety of subcarrier transmission signals output from said data selection unit to inverse Fourier transform so as to output frequency-hopped spread-spectrum transmission signals.

2. The transmitter for a spread-spectrum communication system according to claim 1, wherein said data hopping unit further comprises:
   a pseudo random sequence generator including a plurality of shift registers and barrel-shifting values held in the shift registers at the predetermined hopping rate;
   a plurality of multipliers each configured to assign a predetermined weight to each of the values held in the shift registers; and
   an adder configured to calculate a sum of outputs from said multipliers so as to output the hopping pattern of the predetermined sequence length.

3. A transmitter for a spread-spectrum communication system, said transmitter comprising:
   a modulation control unit configured to determine the number of subchannels for the multiplexing of transmission data and the number of subcarriers for frequency-hopping in each of the subchannels;
   a serial-to-parallel converting unit configured to split the transmission data into subchannel transmission data for as many subchannels as determined by said modulation control unit;
   a plurality of subchannel modulation processing units each configured to receive the corresponding subchannel transmission data for independent modulation processing so as to output a plurality of subcarrier transmission signals, each of said subchannel modulation processing units including
      1) a frame generation unit configured to construct a frame by inserting a predetermined pilot sequence in the subchannel transmission data
      2) a data modulation unit configured to subject the subchannel transmission data of a frame structure to a predetermined data modulation process so as to output a modulated signal, 3) a time-spreading unit configured to subject the modulated signal to a time-spreading process by multiplying the modulated signal by a predetermined time-spreading code, 4) a data hopping unit including at least one multiplier and configured to output a plurality of subcarrier transmission signals corresponding to the respective subcarriers, by receiving the modulated signal subjected to the time-spreading process, generate a predetermined hopping pattern of a predetermined sequence length, and output as the subcarrier transmission signal only the modulated signal carried in a subcarrier designated by the hopping pattern, while maintaining the other subcarrier transmission signals at a zero output level; and an inverse Fourier transform unit configured to subject the entirety of subcarrier transmission signals output from said data hopping unit of said plurality of subchannel modulation processing units to inverse Fourier transform so as to output transmission signals multiplexed using said plurality of subchannels in which frequency-hopping spectrum-spreading is effected.

4. The transmitter for a spread-spectrum communication system according to claim 3, wherein said data hopping unit comprises:

a pseudo random sequence generator including a plurality of shift registers and barrel-shifting values held in the shift registers at the predetermined hopping rate;

a plurality of multipliers each configured to assign a predetermined weight to each of the values held in the shift registers; and an adder configured to calculate a sum of outputs from said multipliers so as to output the hopping pattern of the predetermined sequence length.

5. The transmitter for a spread-spectrum communication system according to claim 3, wherein said modulation control unit is further configured to determine subcarrier assignment such that the subcarriers for frequency hopping are spaced apart at predetermined frequency intervals, and said transmitter further comprises a subcarrier assignment unit configured to receive a plurality of subcarrier transmission signals output from each of said subchannel modulation processing units, rearranging the entire subcarrier transmission signals in accordance with the subcarrier assignment, and outputting the rearranged subcarrier transmission signals to said inverse Fourier transform unit.

6. The transmitter for a spread-spectrum communication system according to claim 3, further comprising:

a convolution coding unit configured to subject the transmission data to convolution coding for error correction; and an interleaver configured to subject the transmission data subjected to error correction to a predetermined interleaving process, wherein the transmission data subjected to the interleaving process is output to said serial-to-parallel converting unit.

7. The transmitter for a spread-spectrum communication system according to claim 3, further comprising:

a communication quality monitoring unit configured to receive information related to the quality of communication from a receiver with which said transmitter is communicating and determine the quality of communication based on the information, wherein said modulation control unit is further configured to modify a subcarrier assignment defined by the number of subchannels for multiplexing and the number of subcarriers per subchannel, in accordance with a result of determination on the quality of communication.

8. A transmitter for a spread-spectrum communication system, said transmitter comprising:

a modulation control unit configured to determine the number of subchannels for the multiplexing of transmission data and the number of subcarriers for frequency-hopping in each of the subchannels;

a serial-to-parallel converting unit configured to split the transmission data into subchannel transmission data for as many subchannels as determined by said modulation control unit;

a plurality of subchannel modulation processing units each configured to receive the corresponding subchannel transmission data for independent modulation processing so as to output a plurality of subcarrier transmission signals, each of said subchannel modulation processing units including 1) a frame generation unit configured to construct a frame by inserting a predetermined pilot sequence in the subchannel transmission data, 2) a data modulation unit configured to subject the subchannel transmission data of a frame structure to a predetermined data modulation process so as to output a modulated signal, 3) a data hopping unit including at least one multiplier and configured to output a plurality of subcarrier transmission signals corresponding to the respective subcarriers, by receiving the modulated signal, generate a predetermined hopping pattern of a predetermined sequence length, and output as the subcarrier transmission signal only the modulated signal carried in a subcarrier designated by the hopping pattern, while maintaining the other subcarrier transmission signals at a zero output level;

an inverse Fourier transform unit configured to subject the entirety of subcarrier transmission signals output from said data hopping unit of said plurality of subchannel modulation processing units to inverse Fourier transform so as to output transmission signals multiplexed using said plurality of subchannels in which frequency-hopping spectrum-spreading is effected; and a guard interval (GI) inserting unit configured to insert a predetermined guard interval to the transmission signal output from said inverse Fourier transform unit.

9. A spread-spectrum modulation method in which transmission data is subject to spectrum spreading using a predetermined number of subcarriers, comprising the steps of:

multiplying at least one pseudo random value to produce at least one weight factor;

generating a hopping pattern of a predetermined sequence length, based on the at least one weight factor, and switched at a predetermined hopping frequency, the hopping pattern designating a subcarrier for frequency hopping;

outputting a plurality of subcarrier transmission signals corresponding to the plurality of subcarriers, respectively, by receiving the transmission data and outputting as a subcarrier transmission signal only the transmission data carried in a subcarrier designated by the hopping pattern, while maintaining the other subcarrier transmission signals at a zero output level; and subjecting the entirety of subcarrier transmission signals to inverse Fourier transform so as to output frequency-hopped spread-spectrum transmission signals.

* * * * *